United States Patent
Sheldon et al.

(10) Patent No.: US 10,904,454 B2
(45) Date of Patent: Jan. 26, 2021

(54) AUTOMATED POLARIZER POSITIONING

(71) Applicant: Motorola Mobility LLC, Chicago, IL (US)

(72) Inventors: Cole Preston Sheldon, Grayslake, IL (US); David Thomas Platner, Chicago, IL (US); John Christopher Pincenti, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/439,263

(22) Filed: Jun. 12, 2019

(65) Prior Publication Data

US 2020/0393688 A1 Dec. 17, 2020

(51) Int. Cl.
| | | |
|---|---|---|
| *H04N 5/238* | (2006.01) | |
| *G02B 27/28* | (2006.01) | |
| *H04N 5/225* | (2006.01) | |
| *G02B 26/08* | (2006.01) | |
| *H04N 5/235* | (2006.01) | |

(52) U.S. Cl.
CPC .............. *H04N 5/238* (2013.01); *G02B 26/08* (2013.01); *G02B 27/281* (2013.01); *G02B 27/288* (2013.01); *H04N 5/2254* (2013.01); *H04N 5/2258* (2013.01); *H04N 5/2351* (2013.01)

(58) Field of Classification Search
CPC ............ G02B 5/30–3091; G02B 26/00; G02B 26/08–129; G02B 27/28–288; G02F 1/0136; G02F 2001/0139–0144; H04N 5/2254; H04N 5/235; H04N 5/2351; H04N 5/2352; H04N 5/238
See application file for complete search history.

(56) References Cited

U.S. PATENT DOCUMENTS

| | | | |
|---|---|---|---|
| 9,057,896 B1 * | 6/2015 | Baldwin .............. | H04N 5/2254 |
| 9,294,680 B1 | 3/2016 | Pavelle et al. | |
| 2008/0246948 A1 * | 10/2008 | Van Schaik .......... | H04N 5/2254 |
| | | | 356/51 |
| 2008/0252882 A1 * | 10/2008 | Kesterson .............. | G02B 5/208 |
| | | | 356/300 |
| 2010/0157082 A1 * | 6/2010 | Katerberg .............. | G03B 17/14 |
| | | | 348/222.1 |
| 2012/0307132 A1 * | 12/2012 | Fan ...................... | H04N 5/2258 |
| | | | 348/348 |
| 2015/0124148 A1 * | 5/2015 | Osoinach ............... | H04N 5/238 |
| | | | 348/335 |

* cited by examiner

*Primary Examiner* — Paul M Berardesca
(74) *Attorney, Agent, or Firm* — SBMC

(57) ABSTRACT

In aspects of automated polarizer filter positioning, a device includes a polarizer integrated with the device and auto-positioned to filter lighting of a camera scene. The device includes a camera device to capture a digital image of the camera scene using the polarizer at a rotation angle of the polarizer. The device implements an imaging manager to determine an orientation of the device relative to a position of the sun. The imaging manager can also determine the lighting of the camera scene as viewable with the camera device, and position the polarizer at the rotation angle based on the orientation of the device and the lighting of the camera scene to filter the lighting. The imaging manager can then initiate the camera device to capture the digital image of the camera scene with an imager of the camera device at the rotation angle of the polarizer.

20 Claims, 13 Drawing Sheets
(4 of 13 Drawing Sheet(s) Filed in Color)

518  Non-Polarized    520  Polarized

AUTOMATED POLARIZER POSITIONING

BACKGROUND

A digital image captured with a camera device can include areas of unwanted reflected and/or scattered light in the captured image. The area of reflected light in the captured image can occur due to a limited dynamic range of the imager in a camera device, or may also occur due to strong light reflections from the sun or from a surface in an environment of the captured image. For example, unwanted reflected light in a captured image that includes a portion of the sky can cause the sky to appear pale or washed-out, as opposed to having a blue appearance. Generally, digital images captured with a camera device that does not use a polarizer can include areas of unwanted reflected light within an image, such as based on the position and angle of the sun relative to the direction of the camera's optical axis. Other examples include a flash of the camera device or another light source that may cause light reflections from a surface in the environment of a captured image.

Conventional techniques used for capturing digital images typically utilize a polarizer, such as a polarizing lens or linear polarizer, to change a balance of the light in a captured image. However, capturing images utilizing the polarizer with the camera device can be challenging due to lighting conditions, particularly in low-light environments. A typical polarizer used with a camera device may block half of the available lighting and filters the light at a particular polarization prior to the light entering the camera device and being captured as the digital image. Although polarizer filters can reduce unwanted reflections and glare in captured digital images by blocking certain reflected light from entering the camera, typical polarizer filters are manually adjusted and need to be accurately rotated perpendicular to the environment lighting in order to filter the light effectively.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of automated polarizer positioning are described with reference to the following Figures. The same numbers may be used throughout to reference like features and components shown in the Figures.

DETAILED DESCRIPTION

Figure 1:
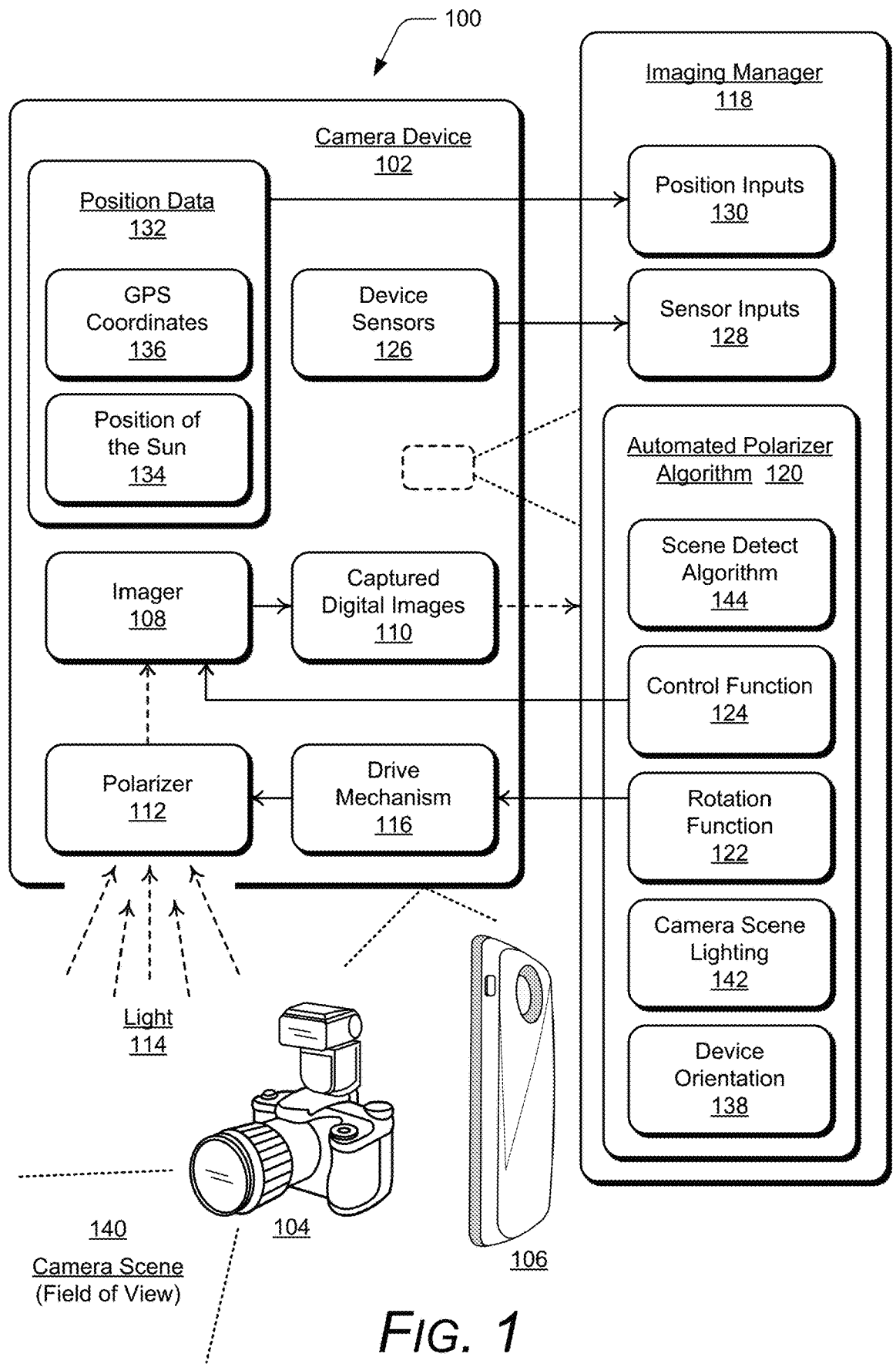
FIG. 1 illustrates an example system that can be used to implement techniques of automated polarizer positioning as described herein.

Implementations of automated polarizer positioning are described, and provide techniques to capture digital images using an automatic rotatable polarizer. Generally, a polarizer is a filter that only passes light with a specific type of polarization and blocks light of other types of polarization. The polarizer reduces the amount of light reaching an imaging sensor, also referred to as an imager, of a camera device by filtering of the light. The light with the specific type of polarization that passes through the linear polarizer is based on a rotational orientation of the polarizer and an angle of polarization of the light reaching the imager. Rotation of the polarizer provides flexibility in filtering the light at various different polarizations as the light passes through the polarizer. Typical applications of a polarizer in photography include to preserve highlights, reduce glare or reflections from a surface in a scene or environment, and to enhance color saturation, such as the sky color in captured images.

A digital image captured with a camera device can include an area of unwanted reflected and/or scattered light in the captured image. The light reflections may occur from a surface in an environment of the captured image, and to obtain a desired image, it is necessary to filter out this reflected light. Alternatively or in addition, scattered light from the sun, a camera flash, or other light may cause unwanted artifacts in a captured image. A property of light is its polarization state, which represents the direction of oscillation of the light waves. Typically, in a natural environment, light is randomly polarized. However, when light is reflected off a surface, it often becomes linearly polarized. A filter that selectively passes a particular polarization state can therefore be used to block the unwanted reflected light. This will eliminate strong reflections, such as those from glass or water, which will obscure parts of a captured image. As another example, light in a captured image that includes a portion of the sky can cause the sky to appear pale or washed-out. However, this light is often polarized and can be filtered out using a polarizer resulting in a more blue color appearance of the sky.

Conventional techniques used for capturing digital images typically utilize a polarizer to change the balance of the light in a captured image. However, capturing images utilizing a polarizer with a camera device can be challenging. A typical polarizer used with a camera device filters light at a particular polarization prior to the light entering the camera device and being captured as the digital image. The direction of polarization of the unwanted light within an image, such as based on the position and angle of the sun relative to the camera's optical axis (e.g., the direction in which the image is captured), can vary and therefore the orientation of the polarizing filter has to be adjusted accordingly. In the conventional techniques, this adjustment is performed manually, can be time consuming, and difficult to obtain the optimal results.

In aspects of automated polarizer positioning, an imaging system includes a camera device, such as any type of digital camera or mobile device that includes at least one integrated camera, can be used to capture a digital image of a scene or environment. Generally, as a type of computing device, the camera device implements a drive mechanism that rotates a polarizer, which is integrated in the camera device. The camera device can also implement an automated polarizer algorithm that activates an imager of the camera device to capture light that passes through the polarizer filtered at a particular polarization.

In implementations, the camera device implements an imaging manager that is designed to utilize inputs from device sensors to determine device orientation and the position of the Sun, from which an angle of polarization can be determined based on the sensor data that is obtained or generated by the device sensors. The various, different device sensors can include a compass, a gyroscope, an accelerometer, and/or other types of motion detection sensors and device orientation sensors to sense motion, position, and orientation of the device, as well as a Global Positioning System (GPS) transceiver for a location determination. The imaging manager includes an automated polarizer algorithm that is implemented to determine the device orientation of the camera device relative to the position of the Sun based on the sensor inputs and other position data.

The camera device has a field-of-view (FOV) of the camera, referred to herein as the camera scene, and the automated polarizer algorithm is implemented to determine the camera scene lighting based in part on the sensor inputs. The camera scene lighting can also be determined using the camera imager, such as in the initial viewfinder mode used to analyze the camera scene before a digital image is captured. Further, given the orientation of the camera device relative to the position of the Sun, a scene detect algorithm can determine whether the Sun and/or sunlight is within the camera scene, likely adding to the camera scene lighting. The polarizer that is integrated with the camera device can then be auto-positioned at a particular rotation angle of the polarizer to filter polarized reflections and/or scattered polarized sunlight based on the device orientation and the camera scene lighting. The automated polarizer algorithm can then initiate to control the imager of the camera device and capture the digital image of the camera scene using the polarizer at the auto-positioned rotation angle of the polarizer.

The automated polarizer algorithm can also be implemented to account for whether the lighting level of the camera scene lighting meets or exceeds a minimal lighting threshold to capture a digital image. As noted above, the polarizer may block half of the available light that is filtered at a particular polarization prior to being captured by the imager as the digital image. This degrades image quality in low-light environments where polarization is not needed. Accordingly, capturing images utilizing the polarizer with the camera device can be challenging due to lighting conditions, particularly in low-light environments.

The automated polarizer algorithm can detect that the lighting level of the camera scene exceeds the minimal lighting threshold, and initiate to use the polarizer to filter polarized light and capture a digital image. Alternatively, the automated polarizer algorithm can detect the lighting level of the camera scene as being low-light that does not meet or exceed the minimal lighting threshold to capture a digital image, and then position the polarizer either out of the camera field-of-view, or at a non-polarized aperture effective to capture the digital image in the low-light.

While features and concepts of automated polarizer positioning can be implemented in any number of different devices, systems, environments, and/or configurations, implementations of automated polarizer positioning are described in the context of the following example devices, systems, and methods.

FIG. 1 illustrates an example system 100 that can be used to implement techniques of automated polarizer positioning as described herein. In this example, the camera device 102 may be any type of digital camera 104 or mobile device 106, such as a mobile phone, tablet device, and/or wearable device. The camera device 102 includes an imager 108, which activates to capture digital images, such as captured digital images 110 that are stored in device memory as described herein. Generally, the camera device 102 is an electronic and/or computing device implemented with various components, such as a processing system and memory, as well as any number and combination of different components as further described with reference to the example device shown in FIG. 14.

A digital image that is captured with the imager 108 of the camera device 102 generally refers to the functions performed by the camera device 102 to image a digital photo when initiated by a photographer or user of the camera device to photograph a person, object, scene, environment, or other type of subject. In terms of digital imaging, image metadata of a captured digital image 110 can also be recorded and stored in the device memory along with the captured digital image, and the image metadata can include such information as a timestamp (e.g., date and time), location data corresponding to when and where an image is captured, and any other information about a digital image, such as exposure and lighting characteristics. The image metadata can also include camera information about camera settings associated with the digital image when the image is captured, such as exposure, focal length, ISO speed rating, flash, camera make and model, lens make and model.

In this example, the camera device 102 includes a polarizer 112 that filters light 114 based on a rotational orientation of the polarizer prior to a digital image 110 being captured by the imager 108. The polarizer 112 can be an integrated component of the camera device 102, or may be an external peripheral component that either attaches to the camera device or is positioned in the path of the light 114. For example, the digital camera 104 or the mobile device 106 can include the polarizer 112 as an integrated component of the device along with the imager 108 as further described herein. Alternatively, the polarizer 112 may be an attachable component that attaches to the digital camera 104 or to the mobile device 106. In implementations, the polarizer may be a linear polarizer, or implemented as a circular polarizer, which is a linear polarizer followed by a quarter wave plate.

The camera device 102 includes a drive mechanism 116 that is implemented to rotate the polarizer 112 at different degrees to capture the digital images 110 at the various different rotation angles of the polarizer. The drive mechanism 116 can be implemented as an electromechanical device that controls rotation of the polarizer 112 through three-hundred-and-sixty degrees (360°). It should be noted that the effective range of rotating the polarizer 112 is between zero degrees and one-hundred-and-eighty degrees (0°-180°). Images captured with the polarizer 112 rotated between zero degrees and one-hundred-and-eighty degrees (0°-180°) are the same as capturing the images with the polarizer rotated between one-hundred-and-eighty degrees and three-hundred-and-sixty degrees (180°-360°). The drive mechanism 116 can be implemented to respond to commands and/or signals to rotate the polarizer 112 through the range of the different degrees, which causes the light 114 to be filtered at the various different rotation angles of the polarizer 112 prior to being captured as the digital images 110 by the imager 108.

In this example, the system 100 includes an imaging manager 118 with an automated polarizer algorithm 120 that implements features of automated polarizer positioning. The automated polarizer algorithm 120 includes a rotation function 122 that is utilized to communicate commands and/or signals to the drive mechanism 116. For example, the rotation function 122 communicates commands to the drive mechanism 116 that causes the drive mechanism 116 to position or rotate the polarizer 112. The commands communicated to the drive mechanism 116 can indicate a specified number of degrees to rotate the polarizer 112, and in response the drive mechanism 116 rotates the polarizer 112 by the specified of number of degrees. Alternatively, the rotation function 122 can communicate a signal to the drive mechanism 116 that is implemented to rotate the polarizer 112 based on a pulse width of the signal. The rotation function 122 can adjust the pulse width of the signal to achieve the desired amount of rotation of the polarizer 112.

Figure 2:
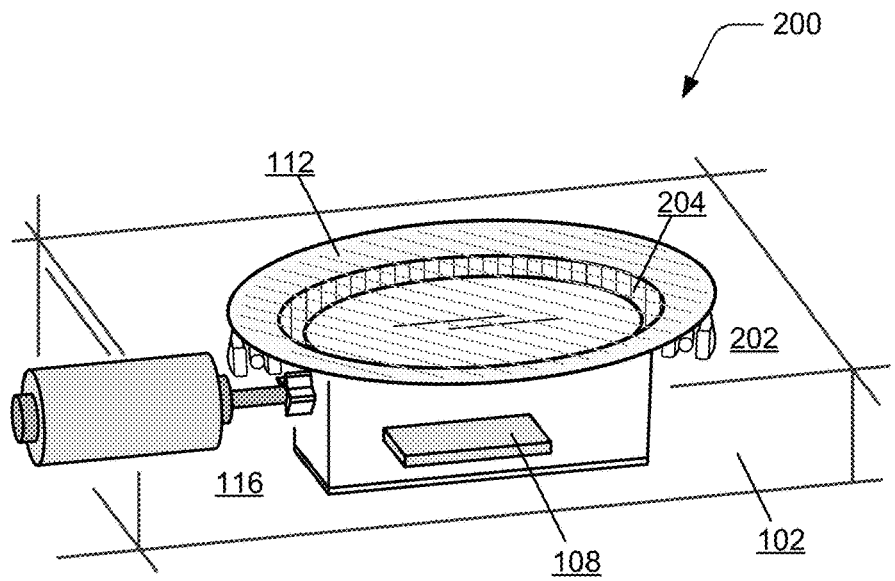
FIG. 2 illustrates an example polarizer assembly with a drive mechanism for automated polarizer positioning to implement the techniques described herein.

FIG. 2 illustrates an example polarizer assembly 200, which includes the drive mechanism 116 implemented as a stepper motor with an encoder. The drive mechanism 116 rotates the polarizer 112, which in this example assembly, is a filter positioned over the lens and imager 108 of the camera device 102. The polarizer 112 can be mounted to a micro bearing 202 with an integrated gearing 204, and rotated as the drive mechanism 116 (e.g., the stepper motor gear drive) engages with the integrated gearing 204 to rotate the polarizer. As shown in FIG. 1, the automated polarizer algorithm 120 also includes a control function 124 implemented to activate the imager 108 to capture the light 114 that passes through the polarizer 112 based on the rotational orientation of the polarizer 112. The captured light by the imager 108 can be stored as a captured digital image 110 in memory of the camera device 102, such as further described with reference to the example device shown in FIG. 9.

In implementations, the camera device 102 can include device sensors 126, such as components of an inertial measurement unit (IMU). The device sensors 126 can be implemented with various different sensors, such as a compass, a gyroscope, an accelerometer, and/or other types of motion detection sensors and device orientation sensors to sense motion, position, and orientation of the device. The device sensors 126 may also include a Global Positioning System (GPS) transceiver for motion and position determinations. The device sensors 126 can generate sensor data, such as vectors having three-dimensional parameters (e.g., rotational vectors in x, y, and z coordinates) indicating position, location, and/or orientation of the device.

Figure 3:
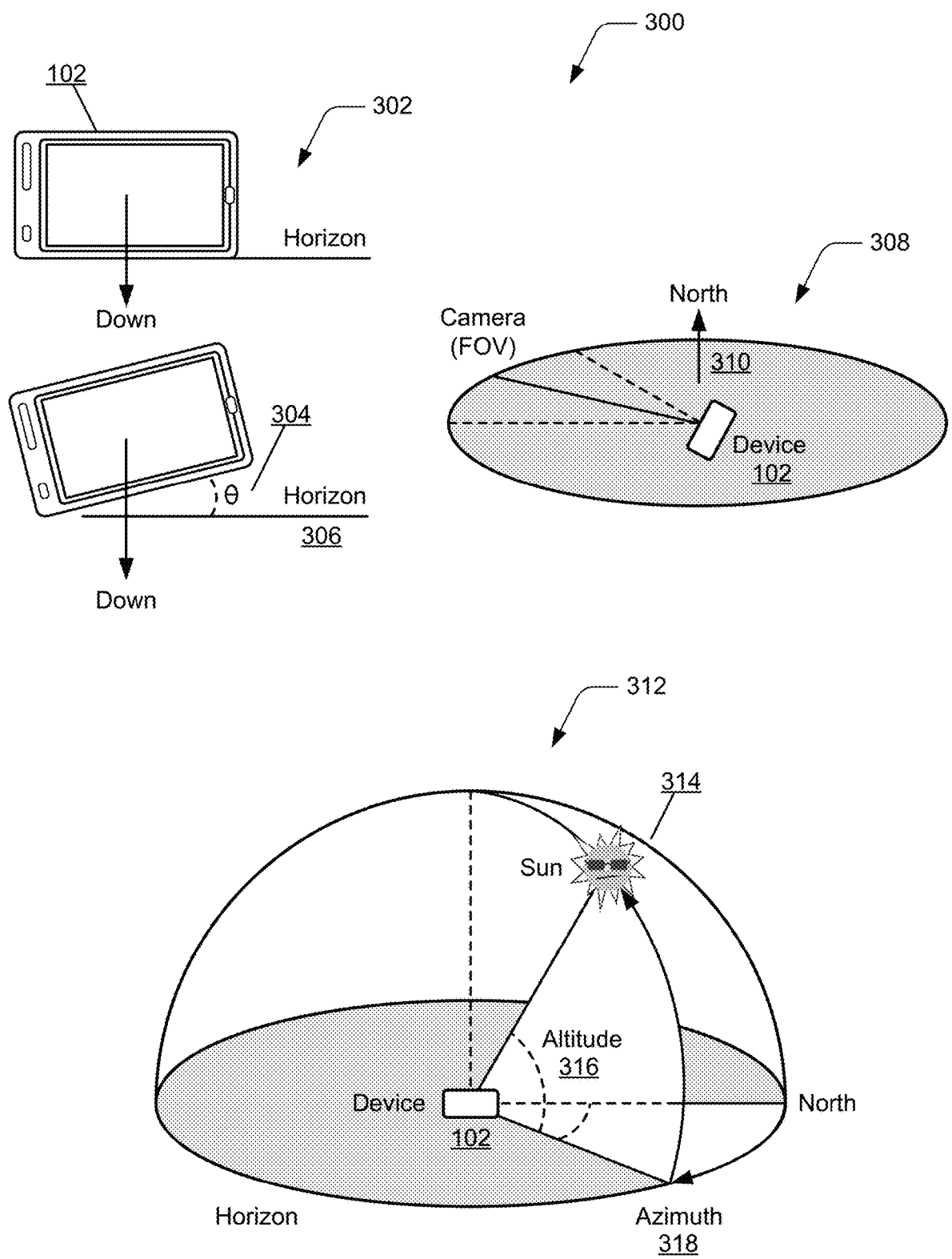
FIG. 3 illustrates examples of sensor data that can be used to determine device orientation and the position of the Sun to implement techniques of automated polarizer positioning as described herein.

FIG. 3 illustrates examples 300 of the types of sensor data that can be used to determine device orientation and the position of the Sun, from which an angle of polarization can be determined based on the sensor data that is obtained or generated by the device sensors 126. For example, as shown at 302, an accelerometer provides gravity sensing from which an orientation (e.g., a tilt angle 304) of the device 102 can be determined relative to the parallel horizon 306. As shown at 308, a compass provides an orientation of the device 102 relative to magnetic north 310 and in relation to the camera field-of-view (FOV). As further shown at 312, GPS coordinates and time data can be utilized to determine a position of the Sun 314 based on the altitude 316 and the azimuth 318 of the Sun relative to the position and orientation of the device 102 at the current time. Notably, the altitude 316 and the azimuth 318 of the position of the Sun can be acquired on-demand and in real-time from any number of accessible, on-line databases.

As shown in FIG. 1, the imaging manager 118 receives sensor inputs 128 (e.g., as sensor data) from the device sensors 126, and also receives position inputs 130 as the position data 132 from the camera device 102. The position data 132 indicates the position of the Sun 134 (also referenced as the position of the Sun 314 in FIG. 3) based on the altitude 316 and the azimuth 318 of the Sun relative to the position and orientation of the camera device 102 at the current time. The position data also includes the GPS coordinates 136 of the camera device 102.

In aspects of automated polarizer positioning, the imaging manager 118 of the camera device 102 includes the automated polarizer algorithm 120, which is implemented to determine the device orientation 138 of the camera device 102 relative to the position of the Sun 134 based in part on the sensor inputs 128 and the position inputs 130. For example, the automated polarizer algorithm 120 can determine a tilt of the device orientation 138 relative to the parallel horizon 306 based on the accelerometer data, and can determine the device orientation 138 relative to magnetic north based on the compass data. The automated polarizer algorithm 120 can also determine the device orientation 138 of the camera device 102 relative to the position of the Sun 134 based on the altitude 316 and the azimuth 318 data at the current time, as generally described above with reference to FIG. 3.

In the example system 100, the digital camera 104 (e.g., as an implementation of the camera device 102) has a field-of-view (FOV) of the camera, referred to herein as the camera scene 140. The automated polarizer algorithm 120 is also implemented to determine the camera scene lighting 142 as viewable in the camera scene 140 with the camera device based in part on the sensor inputs 128 and the position inputs 130. For example, the camera scene lighting can be determined using the camera imager, such as in the initial viewfinder mode used to analyze the camera scene 140 before a digital image is captured. Further, given the device orientation 138 of the camera device 102 relative to magnetic north and the position of the Sun 134, the automated polarizer algorithm 120 can determine whether the Sun and/or sunlight is within the camera scene 140, likely adding to the camera scene lighting 142.

Figure 4:
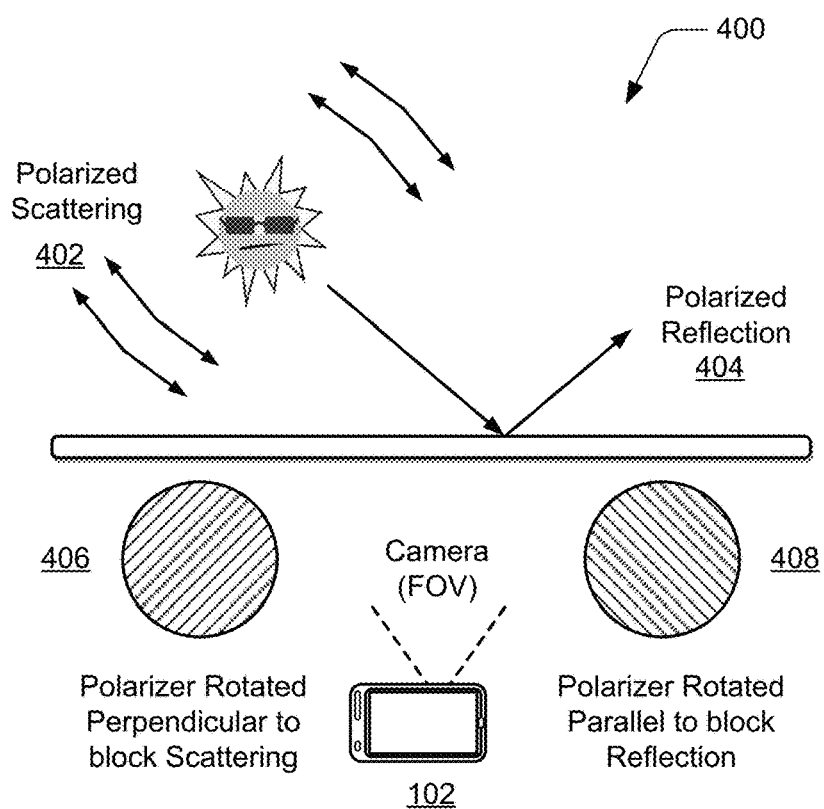
FIG. 4 illustrates an example of polarized sunlight and positioning a polarizer to block different types of the polarized sunlight to implement techniques of automated polarizer positioning as described herein.

FIG. 4 illustrates an example 400 of polarized sunlight and positioning the polarizer 112 to block different types of the polarized sunlight. For example, sunlight may be polarized by scattering (at 402), or may be polarized by reflection (at 404). The polarization by scattering occurs as the light vibrates electrons (in molecules) in the direction of propagation. The electrons radiate producing polarized light perpendicular to the direction of propagation. The sky is naturally polarized in this way, which causes the blue appearance of the sky. The polarization by reflection occurs as the light waves are reflected from a reflective surface, such as reflected from snow, water, asphalt, glass, etc., and the light is naturally polarized. The polarizer 112 that is integrated with the camera device 102 can be auto-positioned at a particular rotation angle of the polarizer to filter the polarized reflection 404 and/or the scattered polarized sunlight 402. For example, the polarizer 112 can be positioned or rotated to a rotation angle that is perpendicular (e.g., rotated 90 degrees from the Sun) to block the scattered polarized sunlight 402, as shown at 406. Alternatively, the polarizer 112 can be positioned or rotated to a rotation angle that is parallel (e.g., rotated towards the Sun) to block the polarized reflection 404, as shown at 408.

Figure 5:
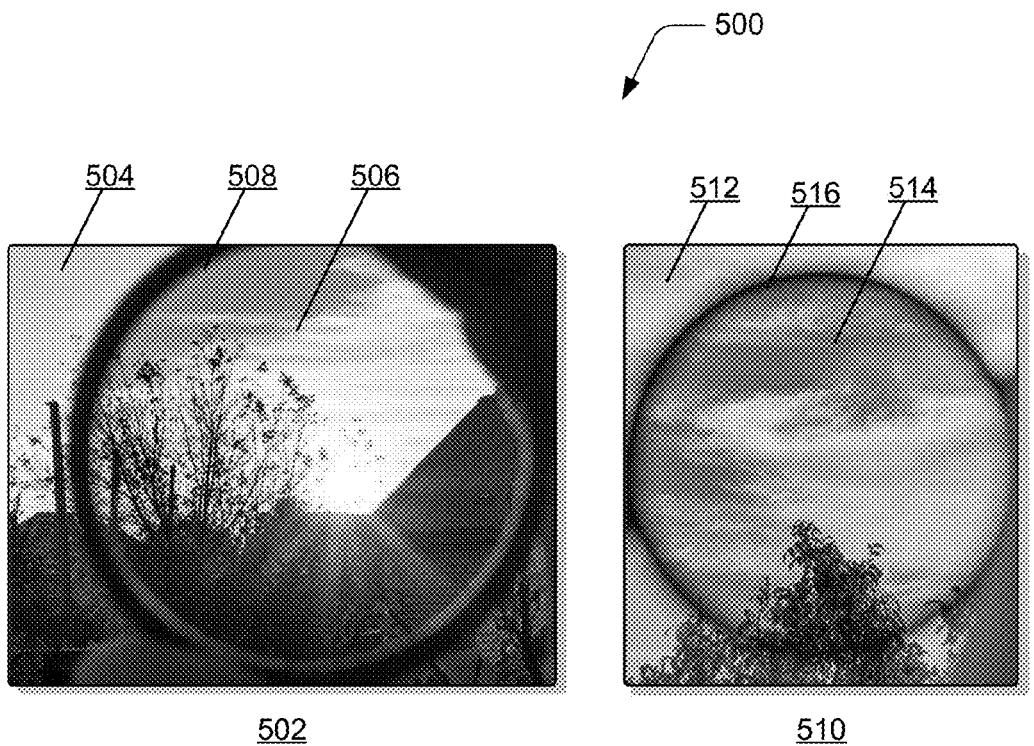
FIG. 5 illustrates examples of digital images that have been captured with a camera device having scattered sunlight within the camera scene (field-of-view of the camera) and using automated polarizer positioning as described herein.
Figure 5:
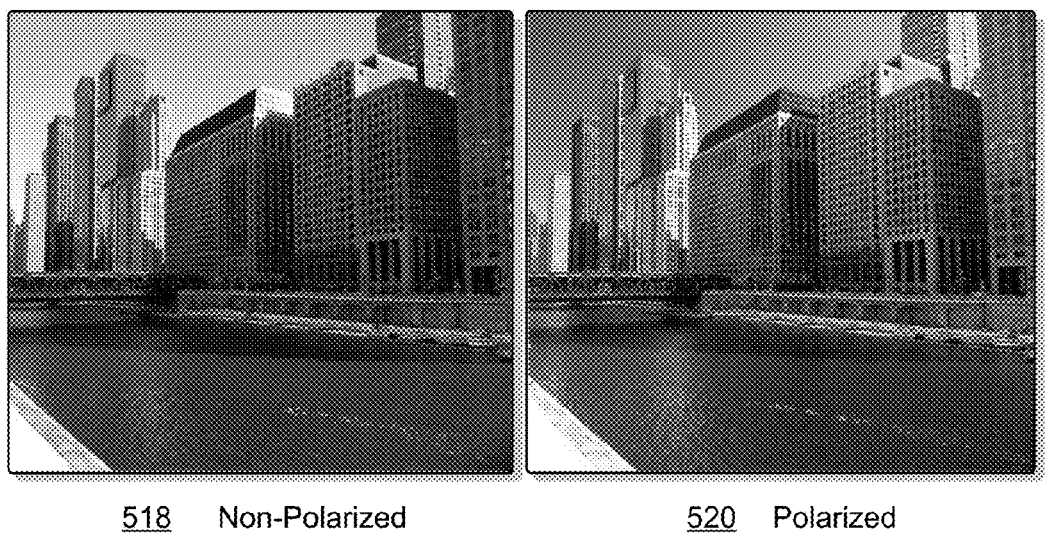

FIG. 5 illustrates examples 500 of digital images that have been captured with a camera device having scattered sunlight and a portion of the sky within the camera scene 140 (e.g., the FOV of the camera). Notably, a digital image 502 illustrates the effect of capturing an image that includes sunlight with a polarizer and without a polarizer (e.g., non-polarized). A portion 504 of the image 502 is shown as captured without a polarizer, and a darker portion 506 of the image shows the effect of using a polarizer 508 positioned or rotated to a rotation angle that is perpendicular (e.g., rotated 90 degrees from the Sun) to block the scattered polarized sunlight 402, as shown at 406 in FIG. 4. Similarly, a digital image 510 illustrates the effect of capturing an image that includes blue sky with a polarizer and without a polarizer (e.g., non-polarized), where a portion 512 of the image 510 is shown as captured without a polarizer, and a different portion 514 of the image shows the effect of using a polarizer 516 positioned or rotated to a rotation angle that is perpendicular (e.g., rotated 90 degrees from the Sun) to block the scattered polarized sunlight. The digital images 502 and 510 are merely shown as examples of capturing an image with or without using a polarizer, such as may be held or attached to a camera lens. In an implementation of automated polarizer positioning with an integrated polarizer as described herein, the digital image 518 was captured without a polarizer (e.g., non-polarized), and the digital image 520 was captured with the polarizer 112 integrated in a camera device and automatically positioned or rotated to a rotation angle that is perpendicular to block the scattered polarized sunlight.

As shown in FIG. 1, the imaging manager 118 in the camera device 102 can utilize a scene detect algorithm 144 to determine whether an image to be captured will include a portion of sky, as well as scattered light as the polarized sunlight and/or reflected light as a polarized reflection. For example, the scene detect algorithm 144 can utilize the sensor inputs 128 and/or the position inputs 130, as well as the viewfinder mode to determine in real-time whether the image to be captured is indoors or outdoors, and will include capturing a portion of the sky during the daytime or during light hours. The scene detect algorithm 144 can be used to detect that the camera scene lighting 142 includes scattered light as polarized sunlight in an outdoor environment that encompasses the camera scene 140. The automated polarizer algorithm 120 can then initiate the rotation function 122 to control the drive mechanism 116 and position the polarizer 112 at the rotation angle that is perpendicular to a direction towards the sun to filter the scattered light. Similarly, the scene detect algorithm 144 can be used to detect that the camera scene lighting 142 includes reflected light as a polarized reflection from a reflective surface that is viewable within the camera scene 140. The automated polarizer algorithm 120 can then initiate the rotation function 122 to control the drive mechanism 116 and position the polarizer 112 at the rotation angle that is parallel to a direction towards the sun to filter the reflected light.

Generally, the polarizer 112 that is integrated with the camera device 102 can be auto-positioned at a particular rotation angle of the polarizer based on the device orientation 138 and the camera scene lighting 142 to filter the lighting. The appearance of the digital image 110 that is to be captured by the imager 108 of the camera device 102 changes in real-time and is impacted as the drive mechanism 116 positions or rotates the polarizer 112 to filter the scattered and/or reflected light 114. The automated polarizer algorithm 120 can then initiate the control function 124 to control the imager 108 of the camera device 102 capturing the digital image 110 of the camera scene 140 using the polarizer 112 at the auto-positioned rotation angle of the polarizer.

In implementations, the imaging manager 118 can also detect motion of the camera device 102 to encompass a different camera scene 140, such as when a user moves the camera device to capture a different photo and changes the field-of-view. The automated polarizer algorithm 120 of the imaging manager 118 can then initiate to re-position the polarizer 112 at a different rotation angle based on an updated determination of the device orientation 138 and an updated determination of the camera scene lighting 142 for the different camera scene. The imaging manager 118, to include the automated polarizer algorithm 120, operates in real-time as the user moves the camera device 102 and the camera scene 140 changes. Similarly, the drive mechanism 116 is controlled by the rotation function 122 as initiated by the automated polarizer algorithm 120 to position or rotate the polarizer 112 in real-time as the image processing in the viewfinder mode of the camera device 102 is performed by the imaging manager.

In other aspects of automated polarizer positioning, the imaging manager 118 can be implemented to detect when the camera device 102 is turned-on, and auto-initialize to position the polarizer 112 at a rotation angle to filter the polarized light 114 within the initial camera scene 140. This includes initializing to determine the device orientation 138 and to determine the camera scene lighting 142 in real-time so as to initially setup the camera device 102 to the best starting position, and then reassess as the user moves the camera device and changes the camera scene 140 (FOV). Notably, positioning of the polarizer 112 is first determined before the imager 108 is initiated with the control function 124 to capture the digital images 110.

The automated polarizer algorithm 120 can also be implemented to account for whether the lighting level of the camera scene lighting 142 meets or exceeds a minimal lighting threshold to capture a digital image 110. As noted above, the polarizer 112 may block half of the available light 114 that is filtered at a particular polarization prior to being captured by the imager 108 as the digital image. This degrades image quality in low-light environments where polarization is not needed. Accordingly, capturing images utilizing the polarizer 112 with the camera device 102 can be challenging due to lighting conditions, particularly in low-light environments.

In implementations, the automated polarizer algorithm 120 can detect that the lighting level of the camera scene 140 exceeds the minimal lighting threshold, and initiate to use the polarizer 112 to filter polarized light and capture a digital image. Alternatively, the automated polarizer algorithm 120 can detect the lighting level of the camera scene 140 as being low-light that does not meet or exceed the minimal lighting threshold to capture a digital image, and then position the polarizer 112 at a non-polarized aperture effective to capture the digital image in the low-light. In implementations, a user interface on the device (e.g., the digital camera 104 or the mobile device 106) can include a user-selectable control, such as a selection icon to turn-on or turn-off the polarization effect, similar to that of a flash control to manually turn-on or turn-off the camera flash.

Figure 6:
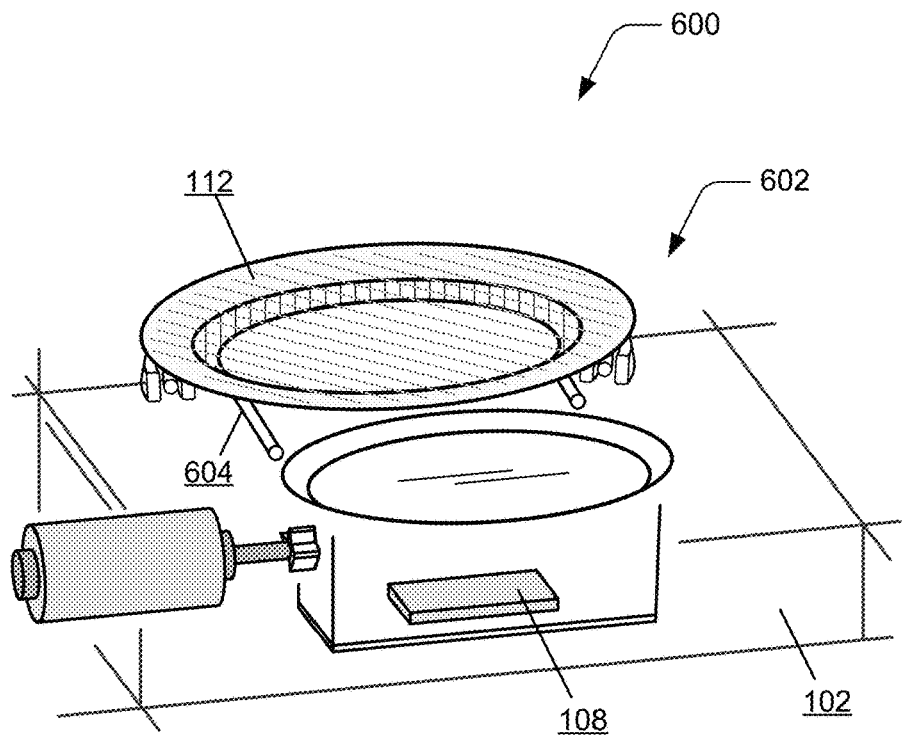
FIG. 6 illustrates example polarizer assemblies as alternative implementations that can be utilized for automated polarizer positioning as described herein.
Figure 6:
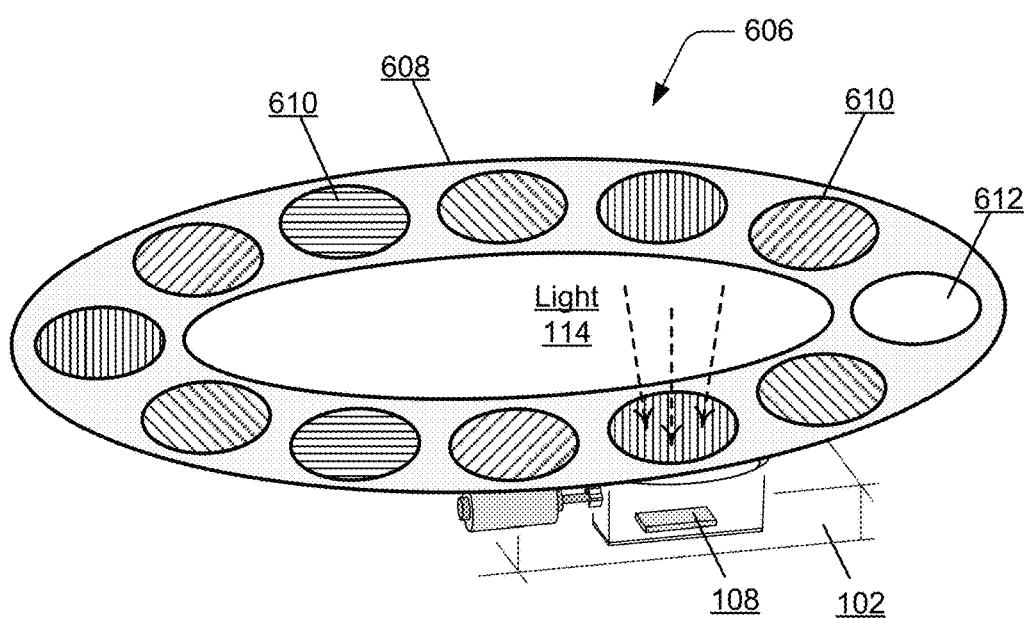

FIG. 6 illustrates example polarizer assemblies 600 as alternative implementations that can be utilized for automated polarizer positioning, such as in the camera device 102. A polarizer assembly 602 includes a mechanism 604 that may be switched or levered to move the polarizer 112 in and out of the camera field-of-view. For example, in the implementation of the polarizer assembly 602, the polarizer 112 is shown moved out or away from over the lens of the camera device 102 and out of the field-of-view of the imager 108. As described above, the automated polarizer algorithm 120 can detect the lighting level of the camera scene 140 as having low-light that does not meet or exceed the minimal lighting threshold to capture a digital image, and then initiate to move the polarizer 112 out of the field-of-view of the imager 108 using the mechanism 604 so that the digital image can be captured in the low-light environment.

An alternate polarizer assembly 606 includes a rotatable disc 608 of individual polarizers 610 at specific rotation angles, and also includes a non-polarized aperture 612 that can be rotated in place over the camera lens and imager 108 to capture digital images in low-light environments (i.e., without the light being filtered). As described above, the automated polarizer algorithm 120 can detect the lighting level of the camera scene 140 as having low-light that does not meet or exceed the minimal lighting threshold to capture a digital image, and then initiate to position the rotatable disc 608 at the position of the non-polarized aperture 612 effective to capture the digital image in the low-light environment.

Example methods 700 and 800 are described with reference to respective FIGS. 7 and 8 in accordance with implementations of automated polarizer positioning. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
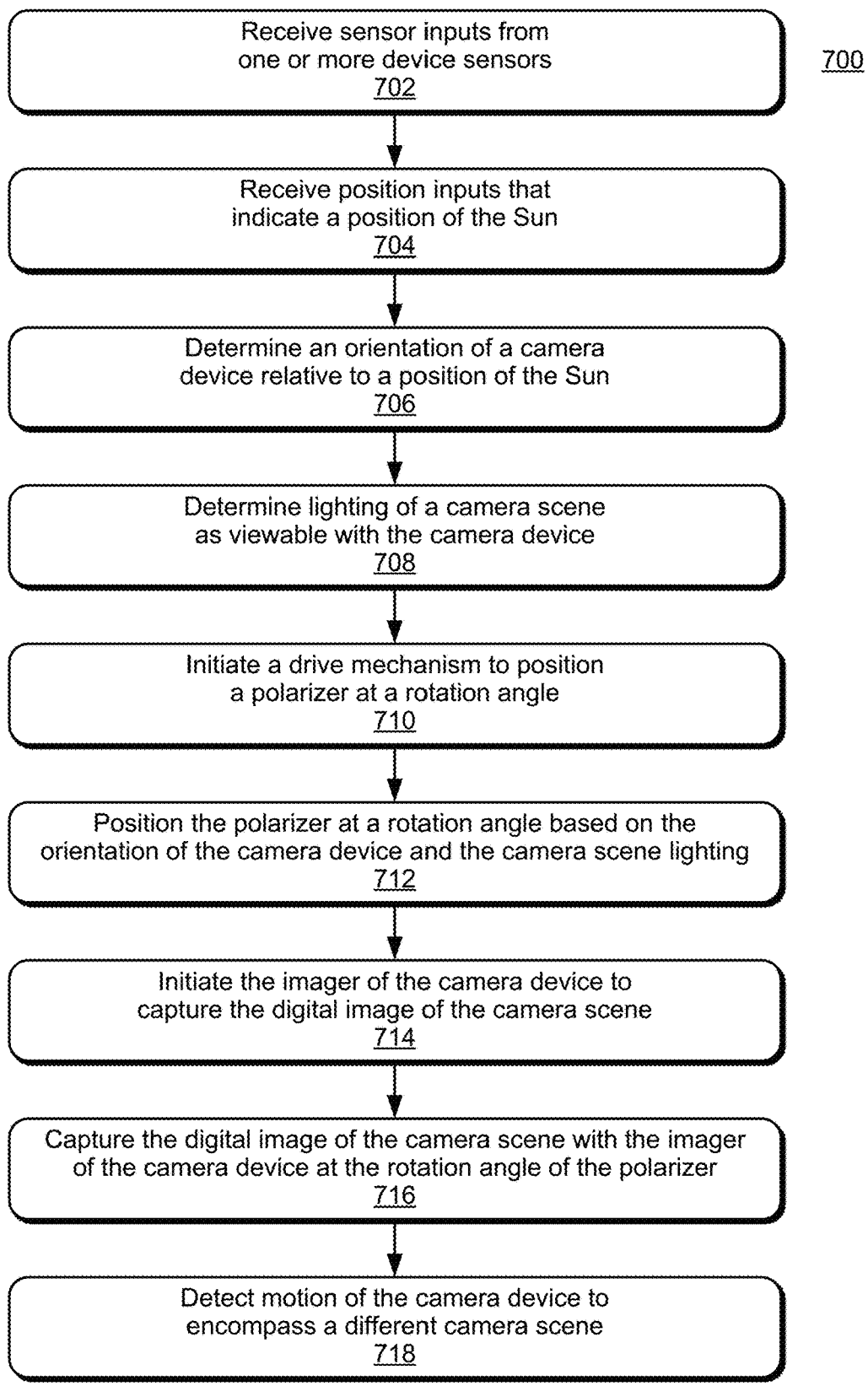
FIG. 7 illustrates an example method of automated polarizer positioning in accordance with one or more implementations of the techniques described herein.

FIG. 7 illustrates example method(s) 700 of automated polarizer positioning, and is generally described with reference to an imaging manager implemented in a camera device. The order in which the method is described is not intended to be construed as a limitation, and any number or combination of the described method operations can be performed in any order to perform a method, or an alternate method.

At 702, sensor inputs are received from one or more device sensors, and at 704, position inputs are received that indicate a position of the Sun. For example, the imaging manager 118 of the camera device 102 receives the sensor inputs 128 (e.g., as sensor data) from the device sensors 126, and also receives the position inputs 130 as the position data 132 from the camera device 102. The position data 132 indicates the position of the Sun 134 based on the altitude 316 and the azimuth 318 of the Sun relative to the position and orientation of the camera device 102 at the current time. The position data also includes the GPS coordinates 136 of the camera device 102.

At 706, an orientation of a camera device relative to a position of the sun is determined. For example, the automated polarizer algorithm 120 of the imaging manager 118 determines the device orientation 138 of the camera device 102 relative to the position of the Sun 134 based in part on the sensor inputs 128 and the position inputs 130, which includes a determination of magnetic north. The automated polarizer algorithm 120 determines a tilt of the device orientation 138 relative to the parallel horizon 306 based on the accelerometer data, and determines the device orientation 138 relative to magnetic north based on the compass data. The automated polarizer algorithm 120 also determines the device orientation 138 of the camera device 102 relative to the position of the Sun 134 based on the altitude 316 and the azimuth 318 data at the current time, as generally described above with reference to FIG. 3.

At 708, lighting of a camera scene as viewable with the camera device is determined. For example, the camera device 102 has a field-of-view (FOV) referred to as the camera scene 140 and the automated polarizer algorithm 120 determines the camera scene lighting 142 as viewable in the camera scene 140 based in part on the sensor inputs 128 and the position inputs 130. The camera scene lighting 142 may include reflected light as a polarized reflection from a reflective surface in the camera scene and/or may include scattered light as polarized sunlight in an outdoor environment as viewed through the camera. The automated polarizer algorithm 120 also determines the camera scene lighting 142 using the camera viewfinder mode to analyze the camera scene 140 before a digital image is captured. Further, given the device orientation 138 of the camera device 102 relative to the position of the Sun 134, the automated polarizer algorithm 120 determines whether the Sun and/or sunlight is within the camera scene 140, likely adding to the camera scene lighting 142.

At 710, a drive mechanism is initiated to position a polarizer at a rotation angle, and at 712, the polarizer is positioned at the rotation angle based on the orientation of the camera device and the camera scene lighting. For example, the automated polarizer algorithm 120 of the imaging manager 118 initiates the drive mechanism 116 that is integrated with the polarizer 112 in the camera device 102, and the drive mechanism 116 is controlled to auto-position the polarizer based on the camera device orientation 138 and the camera scene lighting 142.

In implementations, the scene detect algorithm 144 detects the camera scene lighting 142 includes scattered light as polarized sunlight in an outdoor environment that encompasses the camera scene 140. The automated polarizer algorithm 120 then initiates the rotation function 122 to control the drive mechanism 116 and position the polarizer 112 at the rotation angle that is perpendicular to a direction towards the sun to filter the scattered light. Similarly, the scene detect algorithm 144 detects the camera scene lighting 142 includes reflected light as a polarized reflection from a reflective surface that is viewable within the camera scene 140. The automated polarizer algorithm 120 then initiates the rotation function 122 to control the drive mechanism 116 and position the polarizer 112 at the rotation angle that is parallel to a direction towards the sun to filter the reflected light.

At 714, the imager of the camera device is initiated to capture the digital image of the camera scene, and at 716, a digital image of the camera scene is captured with the imager of the camera device at the rotation angle of the polarizer. For example, the automated polarizer algorithm 120 of the imaging manager 118 controls the imager 108 based on the device orientation 138 of the camera device and the camera scene lighting 142. The automated polarizer algorithm 120 initiates the control function 124 to control the imager 108 of the camera device 102 capturing the digital image 110 of the camera scene 140 using the polarizer 112 at the auto-positioned rotation angle of the polarizer.

At 718, motion of the camera device is detected to encompass a different camera scene. For example, the imaging manager 118 detects motion of the camera device 102 to encompass a different camera scene 140, such as when a user moves the camera device to capture a different photo and changes the field-of-view. The automated polarizer algorithm 120 of the imaging manager 118 then initiates to re-position the polarizer 112 at a different rotation angle based on an updated determination of the device orientation 138 (e.g., at 706) and an updated determination of the camera scene lighting 142 (e.g., at 708) for the different camera scene. The imaging manager 118, to include the automated polarizer algorithm 120, operates in real-time as the user moves the camera device 102 and the camera scene 140 changes. Similarly, the drive mechanism 116 is controlled by the rotation function 122 as initiated by the automated polarizer algorithm 120 to position or rotate the polarizer 112 in real-time as the image processing in the viewfinder mode of the camera device 102 is performed by the imaging manager.

Figure 8:
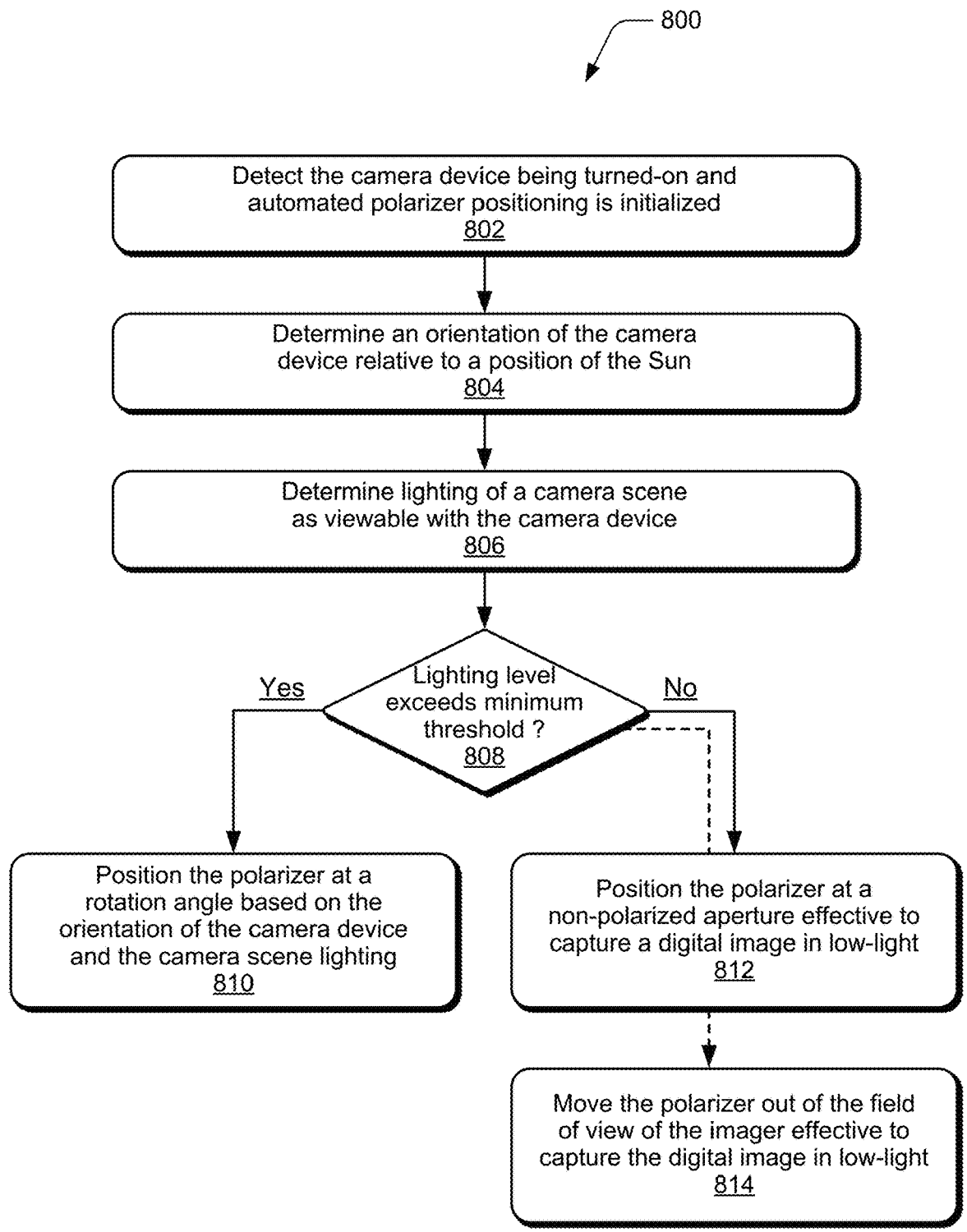
FIG. 8 illustrates an example method of automated polarizer positioning in accordance with one or more implementations of the techniques described herein.

FIG. 8 illustrates example method(s) 800 of automated polarizer positioning, and is generally described with reference to an imaging manager implemented in a camera device. The order in which the method is described is not intended to be construed as a limitation, and any number or combination of the described method operations can be performed in any order to perform a method, or an alternate method.

At 802, the camera device being turned-on is detected and automated polarizer positioning is initialized. For example, the imaging manager 118 of the camera device 102 detects when the camera device is turned-on, and auto-initializes to position the polarizer 112 at a rotation angle to filter the polarized light 114 within the initial camera scene 140. This includes initializing to determine the device orientation 138 and to determine the camera scene lighting 142 in real-time so as to initially setup the camera device 102 to the best starting position, and then reassess as the user moves the camera device and changes the camera scene 140 (FOV).

At 804, an orientation of the camera device relative to a position of the sun is determined. For example, the automated polarizer algorithm 120 of the imaging manager 118 determines the device orientation 138 of the camera device 102 relative to the position of the Sun 134 based in part on the sensor inputs 128 and the position inputs 130, which includes a determination of magnetic north. The automated polarizer algorithm 120 determines a tilt of the device orientation 138 relative to the parallel horizon 306 based on the accelerometer data, and determines the device orientation 138 relative to magnetic north based on the compass data. The automated polarizer algorithm 120 also determines the device orientation 138 of the camera device 102 relative to the position of the Sun 134 based on the altitude 316 and the azimuth 318 data at the current time, as generally described above with reference to FIG. 3.

At 806, lighting of a camera scene as viewable with the camera device is determined. For example, the camera device 102 has a field-of-view (FOV) referred to as the camera scene 140 and the automated polarizer algorithm 120 determines the camera scene lighting 142 as viewable in the camera scene 140 based in part on the sensor inputs 128 and the position inputs 130. The camera scene lighting 142 may include reflected light as a polarized reflection from a reflective surface in the camera scene and/or may include scattered light as polarized sunlight in an outdoor environment as viewed through the camera. The automated polarizer algorithm 120 also determines the camera scene lighting 142 using the camera viewfinder mode to analyze the camera scene 140 before a digital image is captured. Further, given the device orientation 138 of the camera device 102 relative to the position of the Sun 134, the automated polarizer algorithm 120 determines whether the Sun and/or sunlight is within the camera scene 140, likely adding to the camera scene lighting 142.

At 808, a determination is made as to whether the lighting level exceeds a minimal lighting threshold needed to capture a digital image. For example, the automated polarizer algorithm 120 can detect that the lighting level of the camera scene 140 exceeds the minimal lighting threshold, and initiate to use the polarizer 112 to filter polarized light and capture a digital image. Alternatively, the automated polarizer algorithm 120 can detect the lighting level of the camera scene 140 as being low-light that does not meet or exceed the minimal lighting threshold to capture a digital image, and then position the polarizer 112 at a non-polarized aperture effective to capture the digital image in the low-light.

If the lighting level exceeds the minimal lighting threshold needed to capture a digital image (i.e., "Yes" from 808), then at 810, the polarizer is positioned at a rotation angle based on the orientation of the camera device and the camera scene lighting. For example, the automated polarizer algorithm 120 of the imaging manager 118 initiates the drive mechanism 116 that is integrated with the polarizer 112 in the camera device 102, and the drive mechanism 116 is controlled to auto-position the polarizer based on the camera device orientation 138 and the camera scene lighting 142.

If the lighting level does not meet or exceed the minimal lighting threshold needed to capture a digital image (i.e., "No" from 808), then at 812, the polarizer is positioned at a non-polarized aperture effective for capturing the digital image in the low-light. Alternatively, at 814, the polarizer is moved out of the field-of-view of the imager effective to capture the digital image in low-light. For example, the automated polarizer algorithm 120 detects the lighting level of the camera scene 140 as having low-light that does not meet or exceed the minimal lighting threshold to capture a digital image, and then initiates to move the polarizer 112 out of the field-of-view of the imager 108 using the mechanism 604 so that the digital image can be captured in the low-light environment. Alternatively, the automated polarizer algorithm 120 detects the lighting level of the camera scene 140 as having low-light that does not meet or exceed the minimal lighting threshold to capture a digital image, and then initiates to position the rotatable disc 608 at the position of the non-polarized aperture 612 effective to capture the digital image in the low-light environment.

Figure 9:
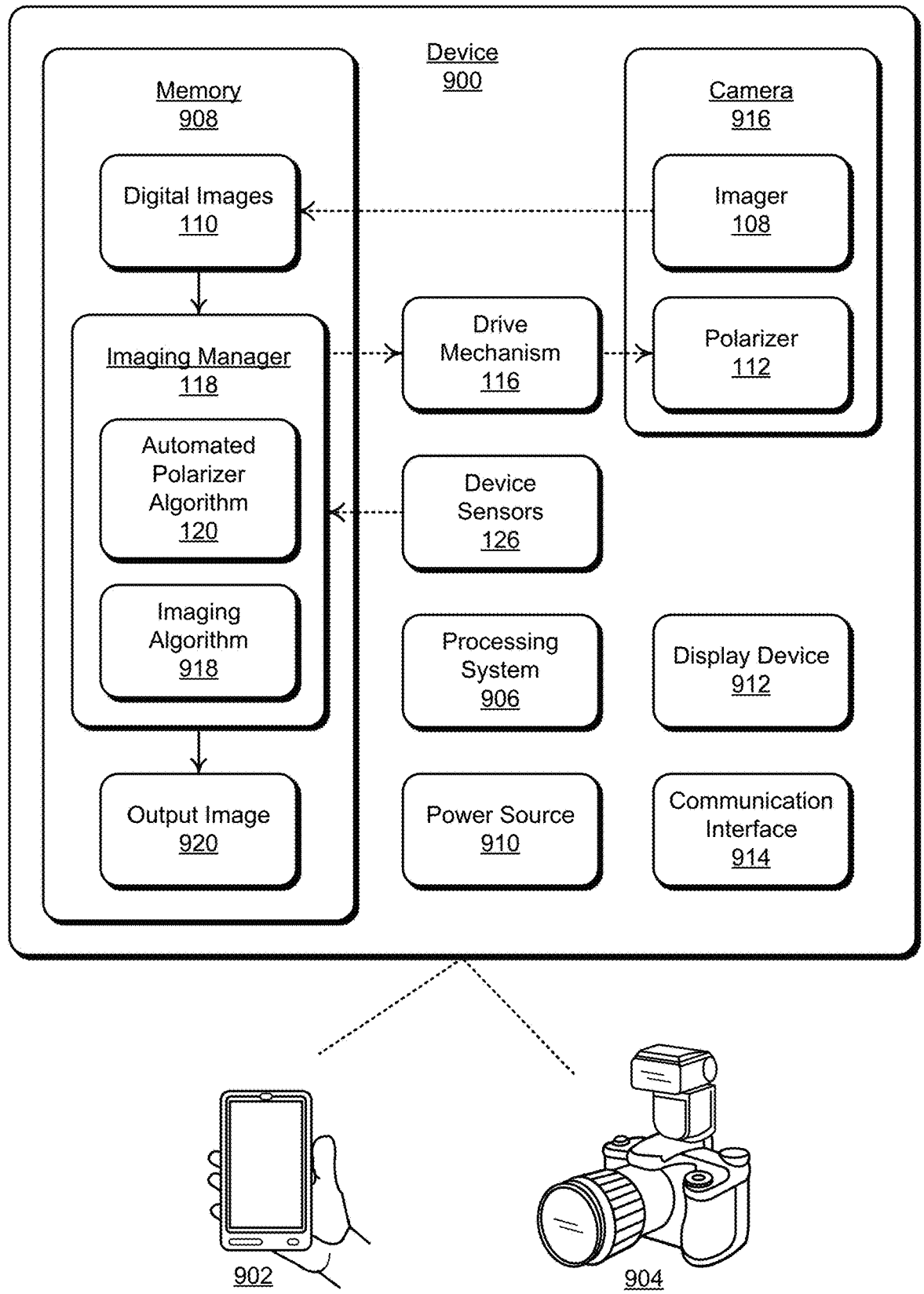
FIG. 9 illustrates an example device in which aspects of automated polarizer positioning can be implemented.

FIG. 9 illustrates an example device 900 in which aspects of automated polarizer positioning can be implemented. The example device 900 includes any type of mobile device, such as a mobile phone 902 or any type of a camera device, such as a digital camera 904 that includes the integrated polarizer 112 and the drive mechanism 116 as described with reference to the camera device 102 shown in FIG. 1. Generally, the device 900 is any type of an electronic and/or computing device implemented with various components, such as a processing system 906 and memory 908, as well as any number and combination of different components as further described with reference to the example device shown in FIG. 14. For example, the device 900 can include a power source 910, a display device 912, and a communication interface 914. In this example, the device 900 may be implemented as the camera device 102 that is shown and described with reference to FIG. 1.

The device 900 includes a camera 916 having the imager 108 implemented to capture digital images, such as the digital images 110, that are stored in memory 908 of the device. Alternatively or in addition, the digital images 110 can be stored in another device communicatively coupled with the device 900 or at a network storage device (e.g., in a cloud-based storage) via the communication interface 914. In this example, the camera 916 also includes the integrated polarizer 112 that filters light based on a rotational orientation of the polarizer prior to a digital image 110 being captured by the imager 108.

In this example, the device 900 includes the imaging manager 118 that implements the automated polarizer algorithm 120, and in implementations of automated polarizer positioning, another imaging algorithm 918 that may be initiated by the imaging manager 118 for reflected lighting and/or indoor environments. The imaging manager 118, the automated polarizer algorithm 120, and/or the imaging algorithm 918 can be implemented as software applications or modules, such as computer-executable software instructions that are executable with a processor (e.g., with the processing system 906). As a software application, any of the imaging manager 118, the automated polarizer algorithm 120, and/or the imaging algorithm 918 can be stored on computer-readable storage memory (e.g., the memory 908), or any suitable memory device or electronic data storage implemented with the camera device. Alternatively, any of the imaging manager 118, the automated polarizer algorithm 120, and/or the imaging algorithm 918 may be implemented in hardware, or as a combination of software and hardware components.

In aspects of automated polarizer positioning, the imaging manager 118 includes the automated polarizer algorithm 120 and the scene detect algorithm 144, which are implemented to determine the device orientation 138 of the device 900 relative to the position of the Sun 134 based in part on the inputs from the device sensors 126; determine the camera scene lighting 142 as viewable in the camera scene 140 with the camera 916 based on the inputs from the device sensors and/or based on the initial viewfinder mode used to analyze the camera scene 140 before a digital image is captured; detect whether the lighting level of the camera scene 140 exceeds a minimal lighting threshold or is a low-light environment; control the drive mechanism 116 to position or rotate the polarizer 112; and activate the imager 108 to capture the light that passes through the polarizer 112 based on the rotational orientation of the polarizer 112 as shown and described with reference to FIGS. 1-8. Further, the automated polarizer algorithm 120 shown in FIG. 9 can include the rotation function 122, the control function 124, and the scene detect algorithm 144 as shown and described with reference to FIG. 1.

In implementations, the polarizer 112 and the drive mechanism 116 may be included in an attachment device that operates with the device 900 via the communication interface 914. For example, a mobile phone 902 may include the device 900 without the integrated polarizer 112 or the drive mechanism 116. The attachment device, which includes the polarizer 112 and the drive mechanism 116, attaches to the mobile phone to operate with the camera of the mobile phone. The imaging manager 118 and/or the automated polarizer algorithm 120 can be stored in memory of the mobile phone 902 or in the attachment device, which is executed by the processing system 906 of the mobile phone or the attachment device. The imaging manager 118 and/or the automated polarizer algorithm 120 communicates with the drive mechanism 116 of the attachment device to rotate the polarizer 112, and communicates with the camera 916 of the mobile phone to capture images using the techniques discussed herein via the communication interface 914.

In other aspects, the imaging manager 118 can initiate the imaging algorithm 918 for indoor environments that have bright areas of reflection, as determined by the scene detect algorithm 144 utilizing the viewfinder mode to analyze the camera scene 140 before a digital image is captured. The imaging algorithm 918 can be implemented to rapidly capture multiple digital images 110 with the imager 108 of the camera 916 in the camera device 900, such that each of the digital images 110 is captured at one of the different rotation angles of the polarizer 112. For example, the imaging algorithm 918 can be implemented to capture the digital images 110 at fifteen degree (15°) increments between zero degrees and one-hundred-and-eighty degrees (0°-180°) by communicating with the drive mechanism 116 to rotate the polarizer 112. The imaging algorithm 918 shown in FIG. 9 can also include the rotation function 122 and the control function 124 as described with reference to FIG. 1, as well as an image analysis function, and a common region function.

The imaging algorithm 918 can select one of the digital images 110 as an output image 920 that can be stored in the memory 908 of the device 900. Alternatively or in addition, the output image 920 can be stored in another device communicatively coupled with the device 900 or at a network storage device (e.g., in a cloud-based storage) via the communication interface 914. The imaging algorithm 918 can also display the output image 920 and/or the captured digital images 110 on the display device 912.

As noted above, the imaging algorithm 918 can include the rotation function 122, which is implemented to communicate commands and/or signals to the drive mechanism 116. For example, the rotation function 122 can be a communicated command to the drive mechanism 116 that causes the drive mechanism to position or rotate the polarizer 112. The command communicated to the drive mechanism 116 can indicate a specified number of degrees to rotate the polarizer 112, and in response the drive mechanism rotates the polarizer by the specified of number of degrees. Alternatively, the rotation function 122 is communicated as a signal to the drive mechanism 116 to position or rotate the polarizer 112 based on a pulse width of the signal. The rotation function 122 can adjust the pulse width of the signal to achieve the desired amount of rotation of the polarizer 112. The imaging algorithm 918 can also include the control function 124, which is implemented to activate the imager 108 to capture the light that passes through the polarizer 112 based on the rotational orientation of the polarizer 112. The captured light by the imager 108 can be stored as a captured digital image 110 in memory 908 of the device 902.

The polarizer 112 can be positioned by the rotation function 122 via the drive mechanism 116 to have a rotational orientation at zero degrees (0°). The imaging algorithm 918 can then invoke the control function 124 to activate the imager 108 to capture a first image of the light that passes through the polarizer having the rotational orientation at zero degrees (0°). The imaging algorithm 918 can then utilize the rotation function 122 to communicate to the drive mechanism 116 to rotate the polarizer 112 fifteen degrees (15°), and the control function 124 can activate the imager 108 to capture a second image of the light that passes through the polarizer 112 having the rotational orientation at fifteen degrees (15°). The imaging algorithm 918 can repeat this process to capture a total of twelve digital images 110 at fifteen degree (15°) increments of the polarizer 112 with the imager 108 of the camera 916 of the device 900.

Alternatively, the imaging algorithm 918 can be implemented to initiate capturing the digital images 110 at any suitable rotation angle of the polarizer 112 by communicating with the drive mechanism 116 to rotate the polarizer 112. For example, the imaging algorithm 918 can be implemented to capture the digital images 110 at three degree (3°) increments between zero degrees and one-hundred-and-eighty degrees (0°-180°) to capture a total of sixty (60) digital images in a similar manner as discussed in the example above. In another example, the imaging algorithm 918 can be implemented to capture the digital images 110 at particular rotational orientations of the polarizer 112, such as capturing images at two degrees (2°), ten degrees (10°), thirty degrees (30°), sixty degrees (60°), one-hundred-and-forty degrees (140°), and one-hundred-and-seventy degrees (170°) of the polarizer 112. Various other increments or rotational orientations of the polarizer 112 to capture the digital images are contemplated.

The imaging algorithm 918 can then receive and process the captured digital images 110 to determine an output image 920 from the captured digital images 110 by utilizing an image analysis function and a common region function. In implementations, the captured digital images 110 may be captured by the imager 108 using an exposure that is constant among the captured digital images 110. In other implementations, the captured digital images 110 may be captured by the imager 108 using an exposure that is not constant among the captured digital images 110. For example, an auto-exposure setting of the camera 916 can be used to capture the digital images, where the auto-exposure setting automatically adjusts an exposure setting for each digital image captured by the imager 108 of the camera 916. When the exposure among the captured digital images 110 is varied or not constant, pixel brightness values for each of the captured digital images can be modified to compensate for the different exposures between the digital images.

The image analysis function can be implemented to determine whether the captured digital images 110 were captured at a constant exposure, such as by using image metadata associated with each of the captured digital images 110 to determine whether the exposure is constant among the captured digital images. If it is determined that the exposure is not constant among the digital images, then one or more of the captured digital images 110 was captured at a different exposure than the other captured digital images.

The image analysis function can also be implemented to modify or adjust pixel brightness values for each of the captured digital images 110 in response to the determination that the exposure is not constant among the captured digital images. To facilitate the modification of the pixel brightness values, the image analysis function can obtain an exposure index from the image metadata for each of the captured digital images 110, where the exposure index of a respective digital image corresponds to scene brightness. The image analysis function can then convert the exposure index to lux (a unit of illumination) for each of the captured digital images. The conversion from the exposure index to lux can be expressed by the following equation:

$$Lux = e^{\left(\frac{ExposureIndex - B}{A}\right)} \quad \text{eq. 1}$$

In equation 1 above, the constants A and B represent values that are specific to a particular device. For example, A can represent a value of −33.82 and B can represent a value of 522.75 associated with the camera 916 of the device 900.

The image analysis function can then determine a multiplier for each of the captured digital images 110 based on the exposure index to lux conversions for each of the captured digital images, as described above. The determination of the multiplier for each of the captured digital images 110 can be expressed by the following equation:

$$r_i = \frac{Lux_i}{Lux_{median}} \quad \text{eq. 2}$$

As shown in equation 2 above, the multiplier for each of the captured digital images 110 ($r_i$, where i is an image identifier of one of the captured digital images) is based on the lux value for a particular captured digital image ($Lux_i$) and a median lux value of all the captured digital images ($Lux_{median}$).

The image analysis function can then modify the pixel brightness values for each of the captured digital images 110 based on a respective multiplier. For example, the pixel brightness values for each of the captured digital images 110 can be multiplied by the respective multiplier to compensate for one or more digital images captured at different exposures of the camera 916 of the device 900. The modification of the pixel brightness can be expressed by the following equation:

$$I_{i,modified} = I_{i,original} * r_i \quad \text{eq 3}$$

As shown in equation 3 above, the pixel brightness values for each of the captured digital images 110 ($I_{i,original}$) is modified by its respective multiplier ($r_i$) determined in eq. 2 above.

The imaging algorithm 918 can invoke the common region function subsequent to the image analysis function modifying the pixel brightness values for each of the captured digital images 110 in response to the determination that the exposure is not constant among the captured digital images. Alternatively, the imaging algorithm 918 can invoke the common region function subsequent to the image analysis function determining that the captured digital images 110 were captured at a constant exposure.

The common region function of the imaging algorithm 918 is implemented to determine a common region in each of the captured digital images 110, where the common region has a variable brightness in each of the digital images. This common region in each of the digital images 110 is an area of pixels where the brightness of light varies given that the brightness variations occur in the digital images due to polarization change. In this example, the common region in the captured digital images 110 can be determined based on a standard deviation of brightness for each pixel in the captured digital images. For example, the common region function can generate a standard deviation of brightness for each pixel of the captured digital images. The common region can be defined as an area of pixels in the captured digital images 110 having a standard deviation of brightness greater than a threshold value on a scale from zero to two-hundred-and-fifty-five (0-255). For example, the common region function can determine the common region as an area in the captured digital images 110 having a standard deviation greater than fifteen (15) as further described with reference to the example visualization of a common region shown in FIG. 12.

When the common region in the captured digital images 110 has been determined, the imaging algorithm 918 can invoke the image analysis function to determine the pixel brightness values of pixels in the common region of the captured digital images. The image analysis function can then select one of the captured digital images 110 that has a lowest pixel brightness value in the common region as the output image 920. In implementations, the image analysis function can average the pixel brightness values of pixels in the common region for each of the digital images 110, and then select the captured digital image that has the lowest average pixel brightness value in the common region. The imaging algorithm 918 can also store the output image 920 in memory 908 of the device 900 or at a network storage device (e.g., in a cloud-based storage).

Figure 10:
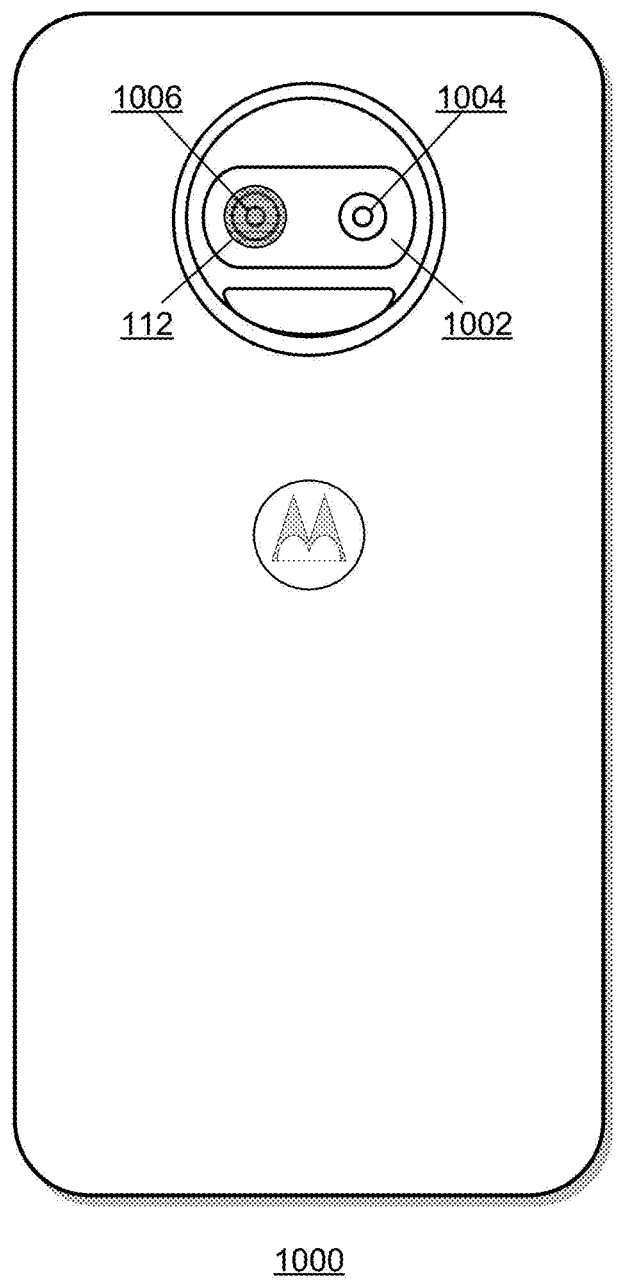
FIG. 10 illustrates an example mobile device implemented as a dual-camera device in which aspects of automated polarizer positioning can be implemented.

FIG. 10 illustrates an example mobile device 1000 in which aspects of automated polarizer positioning can be implemented. The example mobile device 1000 includes any type of a mobile device, such as the mobile device 106 or the mobile phone 902 that includes a camera device and a polarizer, either as an integrated component of the mobile device 1000 or as an attachment that operates with the mobile device. Generally, the mobile device 1000 is any type of an electronic and/or computing device implemented with various components, such as a processing system and memory, as well as any number and combination of different components as further described with reference to the example device shown in FIG. 14. The mobile device 1000 may be implemented as the mobile device 106 that is shown and described with reference to FIG. 1, or as the mobile phone 902 that is shown and described with reference to FIG. 9.

In this example, the mobile device 1000 includes a dual-camera device 1002 having a first imager 1004 and a second imager 1006. A polarizer 112 is positioned to operate with the second imager 1006 and is positioned or rotated by the drive mechanism 116 (not shown) as described above. This dual-camera device implementation enables the first imager 1004 to receive full or unfiltered light, and the second imager 1006 receives filtered light via the polarizer 112. In implementations, the automated polarizer algorithm 120 can initiate to use the first imager 1004 without a polarizer in low-light environments to capture a digital image, or use the second imager 1006 with the polarizer 112 to capture digital images in bright environments, such as when an image to be captured includes a portion of sky, as well as scattered light as polarized sunlight and/or reflected light as a polarized reflection.

Additionally, the imaging algorithm 918 can be implemented to capture, process, and store multiple filtered digital images with the second imager 1006 as described above. The imaging algorithm 918 can also capture, process, and store one or more unfiltered digital images with the first imager 1004. In implementations, the imaging algorithm 918 can utilize the unfiltered light images captured by the first imager 1004 to modify image brightness values of the filtered digital images captured by the second imager 1006. For example, the imaging algorithm 918 can modify the image brightness values of the filtered digital images based on a multiplier determined from lux of the filtered and unfiltered digital images. The multiplier can be determined by the following equation:

$$r_i = \frac{Lux_i}{Lux_{unfiltered\ image}} \quad \text{eq. 4}$$

As shown in equation 4 above, the multiplier for each of the filtered digital images ($r_i$, where i is an image identifier of one of the filtered digital images) is based on the lux value for a particular filtered digital image ($Lux_i$) and a lux value of the unfiltered digital image ($Lux_{unfiltered\ image}$). The imaging algorithm 918 can then modify the pixel brightness values for each of the filtered digital images based on the respective multiplier, as noted above in equation 3.

The imaging algorithm 918 can then determine a common region in the filtered digital images and select an output image 920 using the techniques discussed herein. Additionally, the imaging algorithm 918 can combine the output image 920 along with one of the unfiltered digital images to create a final image that is stored in memory of the mobile device 1000 or at a network storage device. In this way, a mobile device having a dual-camera device can take advantage of using the polarizer without sacrificing much of the light loss associated with polarizers.

Figure 11:
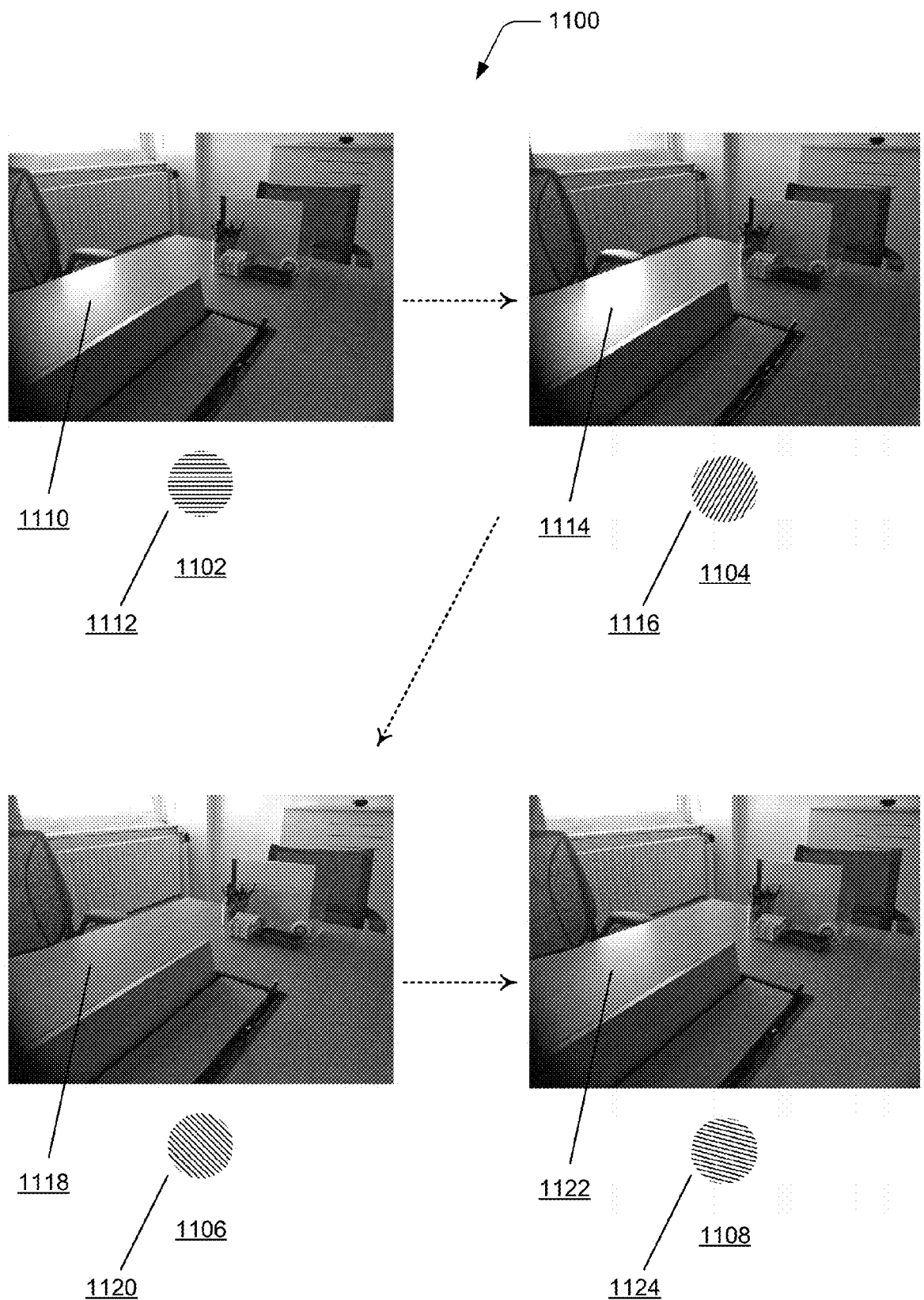
FIG. 11 illustrates examples of captured images utilizing an example camera device implemented for automated polarizer positioning as described herein.

FIG. 11 illustrates examples of captured digital images 1100 in aspects of automated polarizer positioning utilizing the imaging algorithm 918. As described above, the camera 916 of the device 900 can rapidly capture multiple digital images with the imager 108 of the camera, such that each of the captured digital images is captured at one of the different rotation angles of the polarizer 112. In this example, the camera has sequentially captured at least four digital images, such as example images 1102, 1104, 1106, and 1108, at different rotation angles of the polarizer 112.

As shown in the first example image 1102, a light reflection 1110 is captured in the image scene at a zero degree (0°) rotation orientation 1112 of the polarizer 112. As shown in the second example image 1104, a light reflection 1114 is captured in the image scene at a sixty degree (60°) rotation orientation 1116 of the polarizer 112. It can be seen that the light reflection 1114 in the second example image 1104 is noticeably brighter than the light reflection 1110 in the first example image 1102 because the light that passes through the polarizer 112 is being filtered at the zero and sixty degree rotation angles of the polarizer.

As shown in the third example image 1106, a light reflection 1118 is captured in the image scene at a one-hundred-and-thirty-five degree (135°) rotation orientation 1120 of the polarizer 112. It can be seen that the light reflection 1118 in the third example image 1106 is substantially less brighter than the light reflections 1110, 1114 in the respective example images 1102, 1104 because the light that passes through the polarizer 112 is being filtered at the one-hundred-and-thirty-five degree (135°) angle.

Similarly, as shown in the fourth example image 1108, a light reflection 1122 is captured in the image scene at a one-hundred-and-sixty-five degree (165°) rotation orientation 1124 of the polarizer 112. It can be seen that the light reflection 1122 in the fourth example image 1108 is less brighter than the light reflections 1110, 1114 in the respective example images 1102, 1104. However, the light reflection 1122 is brighter than the light reflection 1118 in the example image 1106.

The imaging algorithm 918 can then determine a common region in each of the captured digital images 1100, which can be visualized as the varying brightness of the light reflections 1110, 1114, 1118, and 1122 in the respective captured digital images. As noted above, the imaging algorithm 918 can determine the common region in each of the captured digital images 1100 based on a standard deviation of brightness for each pixel in the captured digital images, which is further described below with reference to FIG. 12.

Figure 12:
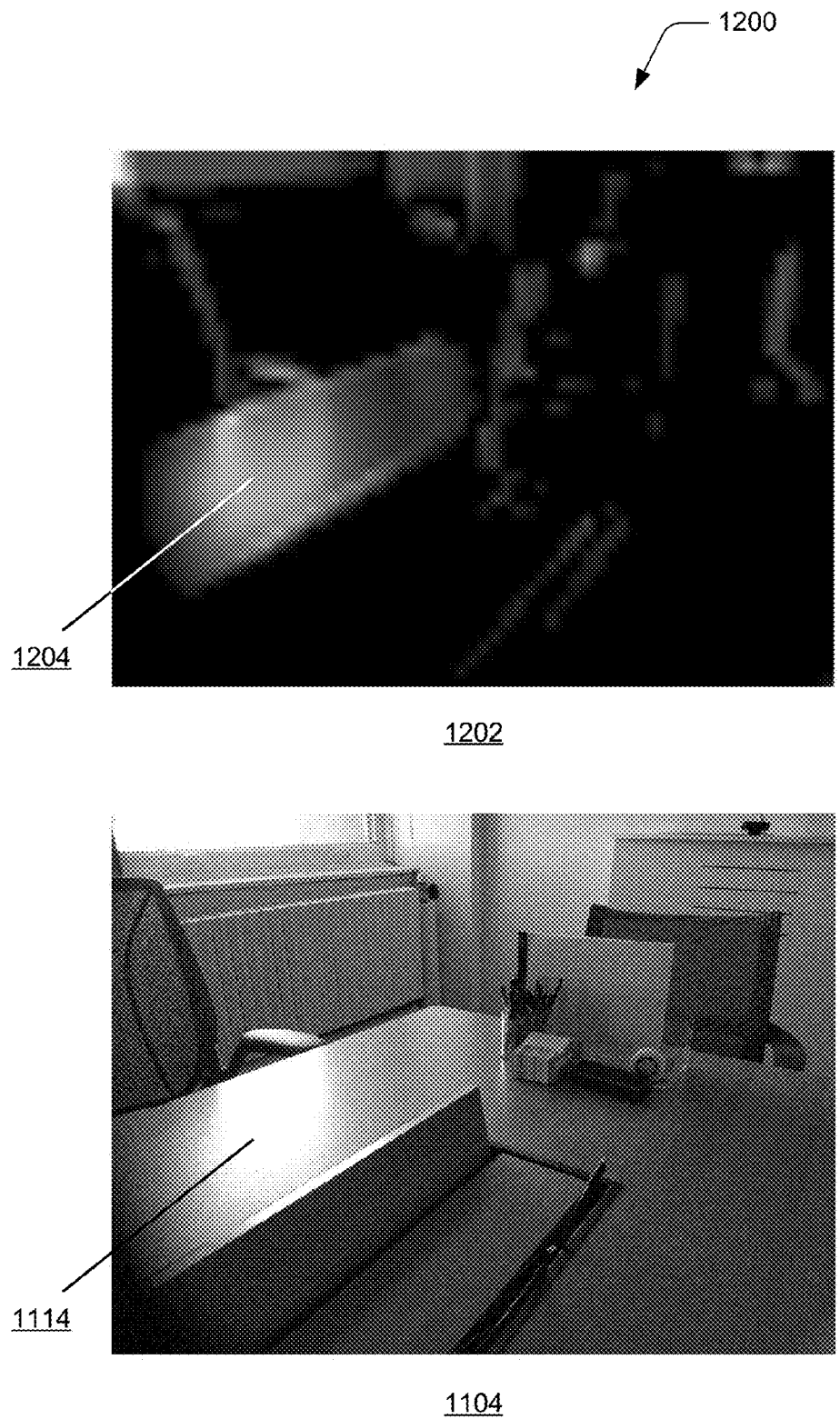
FIG. 12 illustrates an example visualization of a common region in the examples of the captured digital images for automated polarizer positioning as described herein.

FIG. 12 illustrates an example 1200 of a visualization image 1202 of a common region in the examples of the captured digital images 1100 in aspects of automated polarizer positioning utilizing the imaging algorithm 918. As shown in the example 1200, the visualization image 1202 represents a heatmap that indicates areas or regions in the captured digital images 1100 with a standard deviation greater than a particular threshold. In this example, the example visualization image 1202 illustrates the heatmap having areas with a standard deviation of brightness greater than fifteen (15) on a scale of zero to two-hundred-and-fifty-five (0-255). The colors shown in the example visualization image 1202 represent the pixels in the captured digital images 1100 that have a standard deviation of brightness greater than fifteen (15), such that brighter colors represent higher values of the standard deviation of brightness.

The imaging algorithm 918 can determine the common region as an area of pixels in the captured digital images 1100 having a standard deviation of brightness greater than fifteen (15). As shown in the example visualization image 1202, the heatmap indicates an area or region of pixels 1204 in the captured digital images 1100 that is the common region in each of the captured digital images. For comparison, as shown in the example image 1104, the glare or light reflection 1114 appears in the area or region of pixels 1204 defined as the common region in the captured digital images 1100.

The imaging algorithm 918 can then determine pixel brightness values in the common region for each of the captured digital images 1100, and select one of the captured digital images 1100 as the output image 920. In implementations, the imaging algorithm 918 can average the pixel brightness values in the common region for each of the captured digital images 1100. With reference to FIG. 11, it can been seen that the light reflections 1110, 1114, 1118, and 1122 appear within the common region (as indicated by the area or region of pixels 1204) and is the main contributing factor for the average pixel brightness values in the common region. As shown in the example image 1106, the light reflection 1118 is the least bright compared to the other light reflections 1110, 1114, and 1122 of the respective digital images 1102, 1104, and 1108, and results in the average pixel brightness values in the common region of the example image 1106 being the lowest when compared to the other example images 1102, 1104, and 1108.

The imaging algorithm 918 can then select the example image 1106 of the captured digital images 1100 as the output image 920 because the example image has the lowest average pixel brightness values in the common region. In this way, the imaging algorithm 918 selects the output image 920 as the representative of the multiple captured digital images that generally has the least glare or surface reflections in the digital image.

Figure 13:
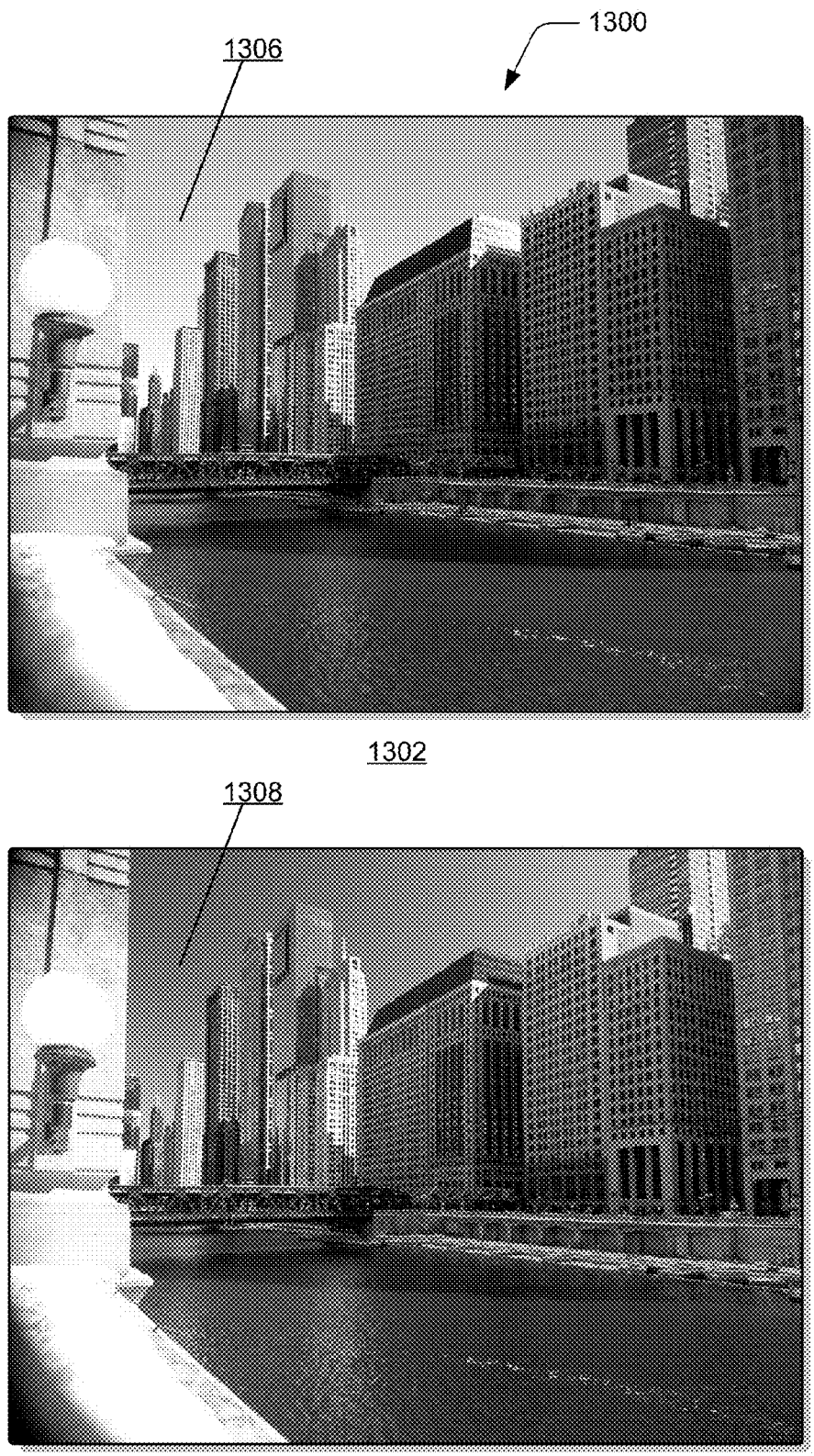
FIG. 13 illustrates examples of captured images utilizing an example camera device implemented for automated polarizer positioning as described herein.

FIG. 13 illustrates examples of captured digital images 1300 in aspects of automated polarizer positioning utilizing the imaging algorithm 918. As described above, the camera 916 of the device 900 can rapidly capture multiple digital images with the imager 108 of the device, such that each of the captured digital images is captured at one of the different rotation angles of the polarizer 112. In this example, the camera has captured at least two digital images, such as example images 1302 and 1304 at different rotation angles of the polarizer 112.

Similar to the description above with reference to FIGS. 11 and 12, the imaging algorithm 918 can determine a common region in the captured digital images 1300 as an area of pixels having a standard deviation of brightness greater than a threshold value on a scale from zero to two-hundred-and-fifty-five (0-255). As shown in the captured digital images 1300, the sky 1306 in the example image 1302 appears brighter than the sky 1308 in the example image 1304 because of rotation orientations of the polarizer 112 when the images were captured.

The imaging algorithm 918 can determine a common region in the captured digital images 1300, which can be visualized as the varying brightness of the sky 1306, 1308 in the respective example images 1302, 1304. Specifically, the imaging algorithm 918 determines the common region in the captured digital images 1300 based on a standard deviation of brightness for each pixel in the captured digital images 1300 being greater than a threshold value as described herein. The area of the sky varies in brightness in the captured digital images 1300 greater than the designated threshold value.

The imaging algorithm 918 can then determine pixel brightness values in the common region for each of the captured digital images 1300, and select one of the captured images as the output image 920. In this example, it can be seen that the sky 1308 in the example image 1304 is the least bright when compared to the sky 1306 in the example image 1302, which results in the average pixel brightness values in the common region of the example image 1304 being the lowest compared to the common region of the example image 1302. The imaging algorithm 918 can then select the example image 1304 of the captured digital images 1300 as the output image 920 because the example image 1304 has the lowest average pixel brightness values in the common region. In this way, the imaging algorithm 918 selects a representative output image among the multiple captured digital images 1300 that generally has better enhanced colors or highlights in the digital image.

Figure 14:
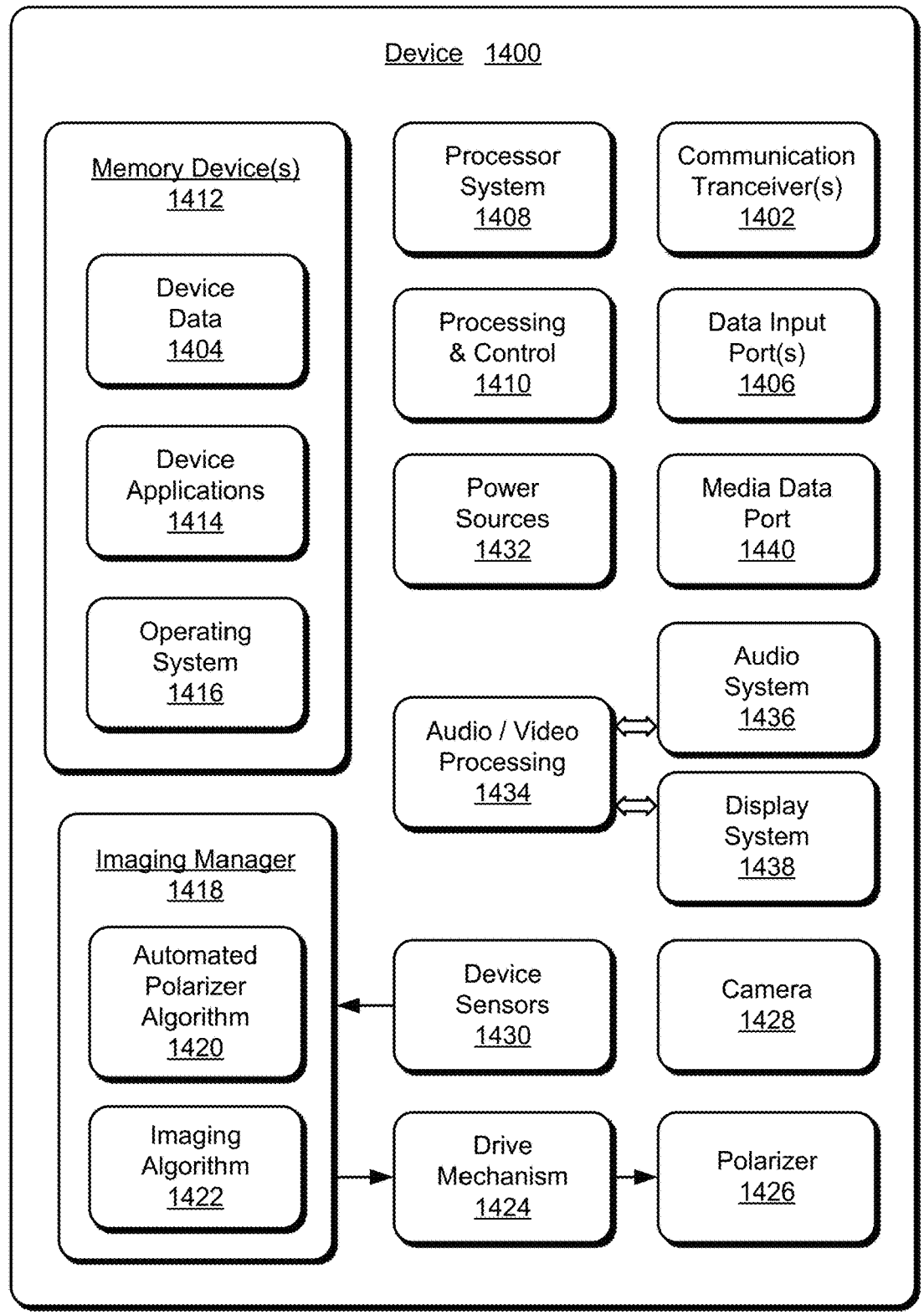
FIG. 14 illustrates various components of an example device that can implement aspects of automated polarizer positioning.

FIG. 14 illustrates various components of an example device 1400, in which aspects of automated polarizer positioning can be implemented. The example device 1400 can be implemented as any of the devices described with reference to the previous FIGS. 1-13, such as any type of a device, mobile device, node device, IoT device, mobile phone, client device, wearable device, tablet, computing, communication, entertainment, gaming, media playback, and/or other type of electronic device. For example, the camera device 102 and the device 900 shown and described with reference to respective FIGS. 1 and 9 may be implemented as the example device 1400. Further a wearable device may include any one or combination of a watch, armband, wristband, bracelet, glove or pair of gloves, glasses, jewelry items, clothing items, any type of footwear or headwear, and/or other types of wearables.

The device 1400 includes communication transceivers 1402 that enable wired and/or wireless communication of device data 1404 with other devices. The device data 1404 can include any of the captured digital images, algorithm data, and/or imaging manager data. Additionally, the device data 1404 can include any type of audio, video, and/or image data. Example communication transceivers 1402 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1400 may also include one or more data input ports 1406 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1400 includes a processor system 1408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1410. The device 1400 may further include any type of a system bus or other data and command transfer system that couples the various components within the device. A system bus can include any one or combination of different bus structures and architectures, as well as control and data lines.

The device 1400 also includes computer-readable storage memory 1412 (e.g., memory devices) that enable data storage, such as data storage devices that can be accessed by a computing device, and that provide persistent storage of data and executable instructions (e.g., software applications, programs, functions, and the like). Examples of the computer-readable storage memory 1412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1400 may also include a mass storage media device.

The computer-readable storage memory 1412 provides data storage mechanisms to store the device data 1404, other types of information and/or data, and various device applications 1414 (e.g., software applications). For example, an operating system 1416 can be maintained as software instructions with a memory device and executed by the processor system 1408. The device applications may also include a device manager, such as any form of a control application, software application, signal-processing and control module, code that is native to a particular device, a hardware abstraction layer for a particular device, and so on.

In this example, the device 1400 includes an imaging manager 1418 that implements aspects of automated polarizer positioning, and includes an automated polarizer algorithm 1420 and an imaging algorithm 1422. The imaging manager 1418 may be implemented with hardware components and/or in software as one of the device applications 1414, such as when the device 1400 is implemented as the camera device 102 and/or as the device 900 described with reference to respective FIGS. 1 and 9. Examples of the imaging manager 1418 include the imaging manager 118 that is implemented as a software application and/or as hardware components in the camera device 102, and the imaging manager 118 that is implemented as a software application and/or as hardware components in the device 900. In implementations, the imaging manager 1418 may include independent processing, memory, and logic components as a computing and/or electronic device integrated with the example device 1400. Examples of the automated polarizer algorithm 1420 and the imaging algorithm 1422 include the automated polarizer algorithm 120 implemented in the camera device 102 (FIG. 1), and the imaging algorithm 918 implemented in the device 900 (FIG. 9).

In this example, the device 1400 includes a drive mechanism 1424 that is implemented to control a polarizer 1426, which is implemented with a camera 1428 of the device. Examples of the drive mechanism 1424 and the polarizer 1426 include the drive mechanism 116 that is implemented to position or rotate the polarizer 112 in the camera device 102 and/or in the device 900, as shown and described with reference to FIGS. 1 and 9.

The device 1400 also includes device sensors 1430, such as may be implemented as components of an inertial measurement unit (IMU). The device sensors 1430 can be implemented with various sensors, such as a gyroscope, an accelerometer, and/or other types of motion sensors to sense motion of the device. The device sensors 1430 can generate sensor data vectors having three-dimensional parameters (e.g., rotational vectors in x, y, and z coordinates) indicating position, location, and/or orientation of the device. The device 1400 can also include one or more power sources 1432, such as when the device is implemented as a mobile device. The power sources may include a charging and/or power system, and can be implemented as a flexible strip battery, a rechargeable battery, a charged super-capacitor, and/or any other type of active or passive power source.

The device 1400 can also include an audio and/or video processing system 1434 that generates audio data for an audio system 1436 and/or generates display data for a display system 1438. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1440. In implementations, the audio system and/or the display system are integrated components of the example device. Alternatively, the audio system and/or the display system are external, peripheral components to the example device.

Although implementations of automated polarizer positioning have been described in language specific to features and/or methods, the subject of the appended claims is not necessarily limited to the specific features or methods described. Rather, the specific features and methods are disclosed as example implementations of automated polarizer positioning, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method, comprising: determining an orientation of a camera device relative to a position of the sun; determining lighting of a camera scene as viewable with the camera device; positioning a polarizer at a rotation angle based on the orientation of the camera device and the lighting of the camera scene, the polarizer integrated with the camera device and auto-positioned to filter the lighting of the camera scene; and capturing a digital image of the camera scene with an imager of the camera device at the rotation angle of the polarizer.

Alternatively or in addition to the above described method, any one or combination of: the lighting of the camera scene includes at least one of reflected light or scattered light, and the polarizer is positioned at the rotation angle to filter the reflected light or the scattered light. The determining the lighting includes determining the reflected light as a polarized reflection from a reflective surface in the camera scene; and the polarizer is positioned at the rotation angle that is parallel to a direction towards the sun to filter the reflected light. The determining the lighting includes determining the scattered light as polarized sunlight in an outdoor environment that includes the camera scene; and the polarizer is positioned at the rotation angle that is perpendicular to a direction towards the sun to filter the scattered light. Initiating a drive mechanism that performs the positioning the polarizer at the rotation angle, the drive mechanism integrated with the polarizer in the camera device and the drive mechanism being controlled based on the orientation of the camera device and the lighting of the camera scene. Initiating the imager of the camera device that performs the capturing the digital image of the camera scene, the imager being controlled based on the orientation of the camera device and the lighting of the camera scene. The method further includes receiving position inputs that indicate the position of the sun; receiving sensor inputs from one or more device sensors; the determining the orientation of the camera device is performed based in part on the position inputs and the sensor inputs; and the determining the lighting of the camera scene is performed based in part on the position inputs and the sensor inputs. Detecting motion of the camera device to encompass a different camera scene; and re-positioning the polarizer in real-time to a different rotation angle based on an updated orientation determination of the camera device and an updated lighting determination of the different camera scene. Detecting the camera device being turned-on; and initializing the positioning the polarizer at the rotation angle responsive to the detecting the camera device being turned-on, the initializing including the determining the orientation of the camera device and the determining the lighting of the camera scene. Auto-initializing the positioning of the polarizer based on the lighting of the camera scene including at least one of reflected light or scattered light, and a lighting level of the camera scene exceeding a minimal lighting threshold for the capturing the digital image. Detecting the lighting of the camera scene as low-light that does not meet or exceed a minimal lighting threshold for the capturing the digital image; and the positioning the polarizer includes the polarizer positioned at a non-polarized aperture effective for capturing the digital image in the low-light.

A device, comprising: a polarizer integrated with the device and auto-positioned to filter lighting of a camera scene; an imager of a camera device to capture a digital image of the camera scene using the polarizer at a rotation angle of the polarizer; a processor system to implement an imaging manager at least partially in hardware to: determine an orientation of the device relative to a position of the sun; determine the lighting of the camera scene as viewable with the camera device; and position the polarizer at the rotation angle based on the orientation of the device and the lighting of the camera scene to filter the lighting of the camera scene.

Alternatively or in addition to the above described device, any one or combination of: the lighting of the camera scene includes reflected light as a polarized reflection from a reflective surface in the camera scene, and the imaging manager is implemented to position the polarizer at the rotation angle that is parallel to a direction towards the sun to filter the reflected light. The lighting of the camera scene includes scattered light as polarized sunlight in an outdoor environment that includes the camera scene, and the imaging manager is implemented to position the polarizer at the rotation angle that is perpendicular to a direction towards the sun to filter the scattered light. A drive mechanism to rotate and position the polarizer at the rotation angle, the drive mechanism integrated with the polarizer in the device, and wherein the imaging manager is implemented to control the drive mechanism based on the orientation of the device and the lighting of the camera scene. The imaging manager is implemented to control the imager of the camera device to capture the digital image of the camera scene, the imager being controlled based on the orientation of the device and the lighting of the camera scene. The imaging manager is implemented to auto-initialize the polarizer being positioned based on the lighting of the camera scene including at least one of reflected light or scattered light, and a lighting level of the camera scene exceeds a minimal lighting threshold to capture the digital image. The imaging manager is implemented to: detect the lighting of the camera scene as low-light that does not meet or exceed a minimal lighting threshold to capture the digital image; and position the polarizer at a non-polarized aperture effective to capture the digital image in the low-light.

A dual-camera device, comprising: a first camera device to capture a full-light digital image of a camera scene; a second camera device to capture a filtered digital image of the camera scene using a polarizer that is integrated with the second camera device and auto-positioned to filter lighting of the camera scene; a processor system to implement an imaging manager at least partially in hardware to: determine an orientation of the dual-camera device; determine the lighting of the camera scene as viewable with the first camera device and the second camera device; and position the polarizer at a rotation angle based on the orientation of the dual-camera device and the lighting of the camera scene to filter the lighting of the camera scene using the second camera device.

Alternatively or in addition to the above described dual-camera device, any one or combination of: the imaging manager is implemented to one of: detect the lighting of the camera scene as low-light that does not meet or exceed a minimal lighting threshold, and initiate the first camera device to capture the full-light digital image of the camera scene; or detect that the lighting of the camera scene exceeds a minimal lighting threshold, auto-position the polarizer at the rotation angle to filter reflected light or scattered light, and initiate the second camera device to capture the filtered digital image of the camera scene.

The invention claimed is:

1. A method, comprising:
   determining an orientation of a camera device relative to a position of the sun;
   determining lighting of a camera scene as viewable with the camera device, the lighting including at least one of reflected light or scattered light;
   positioning a polarizer at a rotation angle based on the orientation of the camera device relative to the position of the sun and the lighting of the camera scene, the polarizer integrated with the camera device and auto-positioned to filter the lighting of the camera scene, the positioning including one of:
      auto-positioning the polarizer at the rotation angle parallel to a direction towards the sun responsive to the determining the lighting of the camera scene includes the reflected light;
      auto-positioning the polarizer at the rotation angle perpendicular to the direction towards the sun responsive to the determining the lighting of the camera scene includes the scattered light; and
   capturing a digital image of the camera scene with an imager of the camera device at the rotation angle of the polarizer.

2. The method as recited in claim 1, wherein:
   the determining the lighting includes determining the reflected light as a polarized reflection from a reflective surface in the camera scene; and
   the auto-positioning the polarizer at the rotation angle parallel to the direction towards the sun filters the reflected light.

3. The method as recited in claim 1, wherein:
   the determining the lighting includes determining the scattered light as polarized sunlight in an outdoor environment that includes the camera scene; and
   the auto-positioning the polarizer at the rotation angle perpendicular to the direction towards the sun filters the scattered light.

4. The method as recited in claim 1, further comprising:
   initiating a drive mechanism that performs the positioning the polarizer at the rotation angle, the drive mechanism integrated with the polarizer in the camera device and the drive mechanism being controlled based on the orientation of the camera device and the lighting of the camera scene.

5. The method as recited in claim 1, further comprising:
   initiating the imager of the camera device that performs the capturing the digital image of the camera scene, the imager being controlled based on the orientation of the camera device and the lighting of the camera scene.

6. The method as recited in claim 1, further comprising:
   receiving position inputs that indicate the position of the sun;
   receiving sensor inputs from one or more device sensors;
   wherein the determining the orientation of the camera device is performed based in part on the position inputs and the sensor inputs; and
   wherein the determining the lighting of the camera scene is performed based in part on the position inputs and the sensor inputs.

7. The method as recited in claim 1, further comprising:
   detecting motion of the camera device to encompass a different camera scene; and
   re-positioning the polarizer in real-time to a different rotation angle based on an updated orientation determination of the camera device and an updated lighting determination of the different camera scene.

8. The method as recited in claim 1, further comprising:
   detecting the camera device being turned-on; and
   initializing the positioning the polarizer at the rotation angle responsive to the detecting the camera device being turned-on, the initializing including the determining the orientation of the camera device and the determining the lighting of the camera scene.

9. The method as recited in claim 1, further comprising:
   auto-initializing the positioning of the polarizer based on the lighting of the camera scene including at least one of the reflected light or the scattered light, and a lighting level of the camera scene exceeding a minimal lighting threshold for the capturing the digital image.

10. The method as recited in claim 1, further comprising:
    detecting the lighting of the camera scene as low-light that does not meet or exceed a minimal lighting threshold for the capturing the digital image; and
    the positioning the polarizer includes the polarizer positioned at a non-polarized aperture effective for capturing the digital image in the low-light.

11. A device, comprising:
    a polarizer integrated with the device and auto-positioned to filter lighting of a camera scene;
    an imager of a camera device to capture a digital image of the camera scene using the polarizer at a rotation angle of the polarizer;
    a processor system to implement an imaging manager at least partially in hardware to:
       determine an orientation of the device relative to a position of the sun;
       determine the lighting of the camera scene as viewable with the camera device, the lighting including at least one of reflected light or scattered light; and
       position the polarizer at the rotation angle based on the orientation of the device relative to the position of the sun and the lighting of the camera scene to filter the lighting of the camera scene, the imaging manager further implemented to one of:
          auto-position the polarizer at the rotation angle parallel to a direction towards the sun responsive to a determination that the lighting of the camera scene includes the reflected light;
          auto-position the polarizer at the rotation angle perpendicular to the direction towards the sun responsive to a determination that the lighting of the camera scene includes the scattered light.

12. The device as recited in claim 11, wherein the reflected light is a polarized reflection from a reflective surface in the camera scene, and the polarizer is auto-positioned at the rotation angle that is parallel to the direction towards the sun to filter the reflected light.

13. The device as recited in claim 11, wherein the scattered light is polarized sunlight in an outdoor environment that includes the camera scene, and the polarizer is auto-positioned at the rotation angle that is perpendicular to the direction towards the sun to filter the scattered light.

14. The device as recited in claim 11, further comprising:
a drive mechanism to rotate and position the polarizer at the rotation angle, the drive mechanism integrated with the polarizer in the device, and wherein the imaging manager is implemented to control the drive mechanism based on the orientation of the device and the lighting of the camera scene.

15. The device as recited in claim 11, wherein the imaging manager is implemented to control the imager of the camera device to capture the digital image of the camera scene, the imager being controlled based on the orientation of the device and the lighting of the camera scene.

16. The device as recited in claim 11, wherein the imaging manager is implemented to auto-initialize the polarizer being positioned based on the lighting of the camera scene including at least one of the reflected light or the scattered light, and a lighting level of the camera scene exceeds a minimal lighting threshold to capture the digital image.

17. The device as recited in claim 11, wherein the imaging manager is implemented to:
detect the lighting of the camera scene as low-light that does not meet or exceed a minimal lighting threshold to capture the digital image; and
position the polarizer at a non-polarized aperture effective to capture the digital image in the low-light.

18. A dual-camera device, comprising:
a first camera device to capture a full-light digital image of a camera scene;
a second camera device to capture a filtered digital image of the camera scene using a polarizer that is integrated with the second camera device and auto-positioned to filter lighting of the camera scene;
a processor system to implement an imaging manager at least partially in hardware to:
determine an orientation of the dual-camera device relative to a position of the sun;
determine the lighting of the camera scene as viewable with the first camera device and the second camera device, the lighting including at least one of reflected light or scattered light; and
position the polarizer at a rotation angle based on the orientation of the dual-camera device relative to the position of the sun and the lighting of the camera scene to filter the lighting of the camera scene using the second camera device, the imaging manager further implemented to one of:
auto-position the polarizer at the rotation angle parallel to a direction towards the sun responsive to a determination that the lighting of the camera scene includes the reflected light;
auto-position the polarizer at the rotation angle perpendicular to the direction towards the sun responsive to a determination that the lighting of the camera scene includes the scattered light.

19. The device as recited in claim 18, wherein the imaging manager is implemented to one of:
detect the lighting of the camera scene as low-light that does not meet or exceed a minimal lighting threshold, and initiate the first camera device to capture the full-light digital image of the camera scene; or
detect that the lighting of the camera scene exceeds a minimal lighting threshold, auto-position the polarizer at the rotation angle to filter the reflected light or the scattered light, and initiate the second camera device to capture the filtered digital image of the camera scene.

20. The method as recited in claim 18, wherein the imaging manager is implemented to:
capture multiple different images of the camera scene with the second camera device at different rotation angles;
determine a common region of brightness in the camera scene as an area of the camera scene with a standard deviation of brightness over the multiple different images above a particular threshold;
select one of the multiple different images as an output image having a lowest average pixel brightness value in the common region among the multiple different images; and
combine the output image with the full-light digital image to create a final image with reduced light loss.

* * * * *